United States Patent
Lengyel et al.

[11] Patent Number: 6,064,393
[45] Date of Patent: May 16, 2000

[54] METHOD FOR MEASURING THE FIDELITY OF WARPED IMAGE LAYER APPROXIMATIONS IN A REAL-TIME GRAPHICS RENDERING PIPELINE

[75] Inventors: Jerome E. Lengyel, Seattle; John Snyder, Redmond; James T. Kajiya, Duvall, all of Wash.

[73] Assignee: Microsoft Corporation, Redmond, Wash.

[21] Appl. No.: 08/904,245

[22] Filed: Jul. 30, 1997

Related U.S. Application Data

[63] Continuation-in-part of application No. 08/671,412, Jun. 27, 1996, Pat. No. 5,867,166, which is a continuation-in-part of application No. 08/560,114, Nov. 17, 1995, abandoned, which is a continuation of application No. 08/511,553, Aug. 4, 1995, abandoned.

[51] Int. Cl.[7] .................................................. G06T 7/20
[52] U.S. Cl. .................... 345/427; 345/426; 345/473; 345/421; 345/435
[58] Field of Search .................................. 345/421, 423, 345/426, 427, 433, 435, 437–439, 473

[56] References Cited

U.S. PATENT DOCUMENTS

| | | | |
|---|---|---|---|
| 5,684,935 | 11/1997 | Demesa, III et al. ................... | 345/419 |
| 5,808,617 | 9/1998 | Kenworthy et al. . | |
| 5,852,443 | 12/1998 | Kenworthy . | |
| 5,864,342 | 1/1999 | Kajiya et al. ........................... | 345/418 |
| 5,880,737 | 3/1999 | Griffin et al. . | |
| 5,886,701 | 3/1999 | Chauvin et al. . | |

OTHER PUBLICATIONS

Cook, R. L., "Shade Trees," *Computer Graphics*, 18:3, 223–231 (Jul. 1984).

Dorsey et al., "Interactive Design of Complex Time–Dependent Lighting," *IEEE Computer Graphics and Applications*, 26–36 (Mar. 1995).

Guenter, et al., "Specializing Shaders," *Computer Graphics Proceedings*, Annual Conference Series, 343–350 (1995).

(List continued on next page.)

*Primary Examiner*—Mark R. Powell
*Assistant Examiner*—Motilewa Good-Johnson
*Attorney, Agent, or Firm*—Klarquist Sparkman Campbell Leigh & Whinston LLP

[57] ABSTRACT

A layered graphics rendering pipeline measures image fidelity ("fiducials") to determine how accurately a transformed image layer approximates a rendering of a 3D object. The graphics rendering pipeline approximates the change in position or color of 3D object by transforming a rendering of the 3D object from a previous frame. The pipeline uses the fiducials to control rendering of factored scene elements to independent image layers. The pipeline then combines the layers to compute frames of animation. The types of fiducials include sampling, visibility, and photometric fiducials. The sampling fiducial measures the distortion of an image sample when warped to screen coordinates. The visibility fiducial measures the change in visibility of a scene element since a previous rendering of the scene element. The photometric fiducial measures either the change in lighting from the time of the previous rendering to the current time, or it measures the difference between warped color samples and actual color samples of the scene element for a current frame.

58 Claims, 10 Drawing Sheets

OTHER PUBLICATIONS

Hanrahan et al., "A Language for Shading and Lighting Calculations," *Computer Graphics*, 24:4, 289–298 (Aug. 1990).

Meier, B. J., "Painterly Rendering for Animation," *Computer Graphics Proceedings*, Annual Conference Series, 477–484 (1996).

Porter, et al., "Compositing Digital Images," *Computer Graphics*, 18:3, 253–259 (Jul. 1984).

Segal, et al., "Fast Shadows and Lighting Effects Using Texture Mapping," *Computer Graphics*, 26:2, 249–252 (Jul. 1992).

Regan, Matthew and Ronald Pose, "Priority Rendering With a Virtual Reality Address Recalculation Pipeline", *ACM SIGGRAPH '94, Computer Graphics Proceedings, Annual Conference Series*, pp. 155–162, 1994.

Regan, Matthew and Ronald Pose, "Low Latency Virtual Reality Display System", *Technical Report No. 92/166, Monash University, Victoria, Australia*, pp. 1–13, Sep. 1992.

Regan, Matthew and Ronald Pose, "A Interactive Graphics Display Architecture", *IEEE Virtual Reality*, 1993 International Symposium, pp. 293–299, 1993.

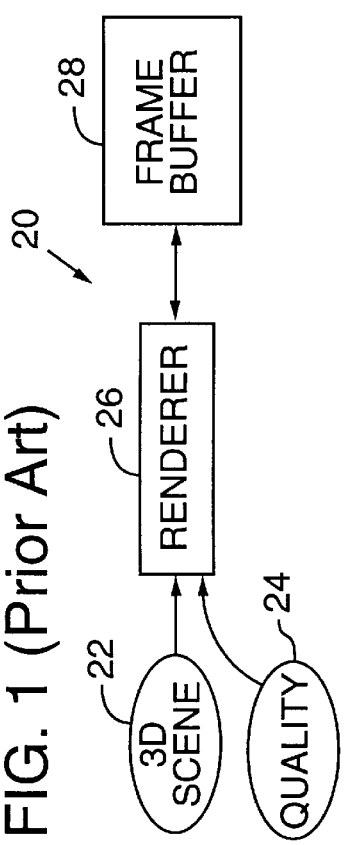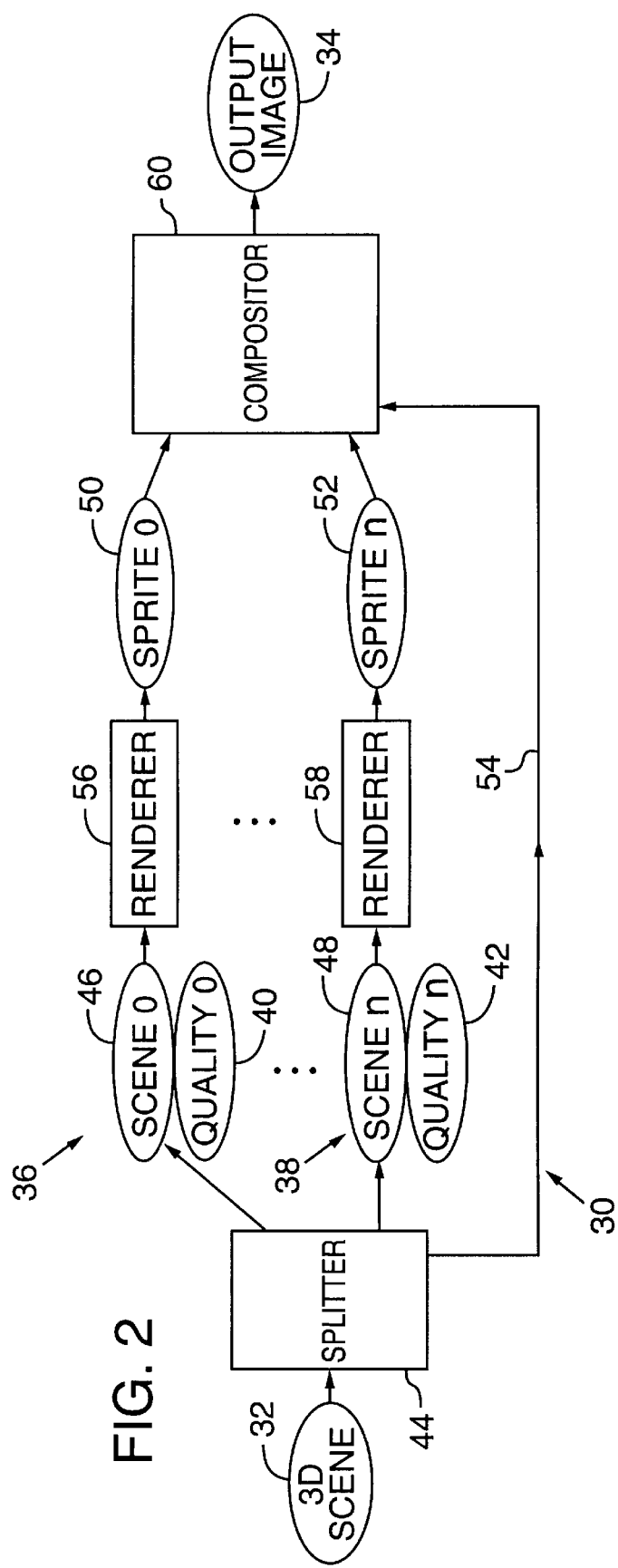

3D SHAPE   SCREEN COORDINATES

METHOD FOR MEASURING THE FIDELITY OF WARPED IMAGE LAYER APPROXIMATIONS IN A REAL-TIME GRAPHICS RENDERING PIPELINE

RELATED APPLICATION DATA

This patent application is a continuation-in-part of U.S. patent application Ser. No. 08/671,412, filed Jun. 27, 1996, now issued as U.S. Pat. No. 5,867,166. Application Ser. No. 08/671,412 is a continuation-in-part of application Ser. No. 08/560,114, filed Nov. 17, 1995, now abandoned. Application Ser. No. 08/560,114 is a continuation of application Ser. No. 08/511,553, filed Aug. 4, 1995, now abandoned.

FIELD OF THE INVENTION

The invention generally relates to real time graphics rendering systems, and more specifically relates to a layered graphics rendering pipeline where parts of a scene are rendered to separate image layers called sprites and composited to form an output image.

BACKGROUND OF THE INVENTION

Three-dimensional (3D) graphics rendering is the process of converting 3D models in a scene to a two-dimensional (2D) image consisting of an array of picture elements or "pixels." In real time 3D graphics, the position of the 3D models and the viewing perspective of the scene (the camera or viewpoint) vary with time, and the rendering system has to repeatedly sample the models and compute new output images to animate the objects depicted in the display image. Performed during the rendering process, lighting and shading operations enhance realism by modeling real world visual effects such as shadows, surface shading, and illumination from different types of light sources. Unfortunately, sophisticated shading operations consume additional rendering resources and are difficult to implement in real time graphics systems where new output images need to be generated repeatedly in only fractions of a second.

FIG. 1 is a high level diagram illustrating a conventional frame buffer architecture 20. A conventional graphics pipeline processes the entire scene database to produce each output image. The scene database (represented as the 3D scene 22) includes 3D graphical models, their attributes such as surface colors, translucency and textures, and any shading models applied to graphical models. The quality parameters 24 of geometry level of detail and texture level of detail can be set independently for each object. However, other quality parameters 24 such as the sampling resolutions in time and space are global, with fixed values for the entire scene.

To generate each new output image, the renderer 26 process the entire scene database to compute an output image comprising an array of pixel values. As it produces pixel values, it places them in a frame buffer 28, which is a large, special purpose memory used to store pixel values for each pixel location in the output image. These pixel values can include a color triplet such as RGB or YUV color, translucency (alpha), and depth (z). The size of the pixel array in the frame buffer is consistent with the resolution of the display device. More concretely, each pixel location in the frame buffer usually corresponds to a screen coordinate of pixel on the display screen of a display device.

In contrast to the conventional frame buffer approach, a fundamentally different approach for generating images is to build parts of an image in separate layers and then composite or superimpose the image layers with each other to construct an output image. Animated cartoons, video games and movie special effects have used a similar approach to construct images. For example, to create animated cartoons, an artist draws a cartoon character in different positions to simulate the character's motion from frame to frame. The drawing of the character can be superimposed on a static background that remains the same for several frames. Some video games use image compositing to superimpose an image or "sprite" onto a static image representing the background of a scene. The movie industry has used image compositing to combine images into a final output image. Porter and Duff have described how to combine images using image operators. See *Compositing Digital Images*, Thomas Porter and Tom Duff, Siggraph 1984, pp. 253–259.

The rendering of scene elements to independent layers can also be extended to real time computer graphics. Specifically, parts of an animated 3D graphics scene can be rendered independently at different update rates and composited to compute frames of animation. See Co-pending patent application Ser. No. 08/671,412 by Nathan P. Myhrvold, James T. Kajiya, Jerome E. Lengyel, and Russell Schick, entitled Method and System for Generating Images Using Gsprites (filed on Jun. 27, 1996), now issued as U.S. Pat. No. 5,867,166, which is hereby incorporated by reference. This patent application describes how to simulate motion of 3D objects by transforming an initial rendering of an object to a new location on the display screen. This can be thought of as a form of interpolation because it approximates the change in position of an object in between renderings of the object. A general 2D transform such as an affine or perspective warp can be used to approximate more complex 3D motion.

While 2D image warps reduce rendering overhead, they can introduce noticeable errors in the output image. One way to measure this error is to use characteristic points on an object to compare the distance in screen coordinates between points in a warped image and the same points from the object's model, projected into the view space. The distances between these points are a measure of the geometric error of the warped image. The geometric error provides some information about the fidelity of the warped image layer and can be used to determine when the object should be re-rendered, rather than approximated using an image warp.

The geometric error does not accurately reflect the fidelity of the warped image in all cases, however. For example, it is possible to have almost no geometric error yet still have noticeable distortion. An image layer representing a rendering of an object can be scaled to simulate the object moving closer or farther from the view point. The geometric error may be negligible in this case, but the samples may become so large that they become blurry or so small that the rendering system is incapable of filtering them. In addition, it is possible for an object and the viewpoint to remain stationary while the light source moves or changes over time. In this case, the geometric error will be zero yet the image layer will not accurately reflect the change in lighting. It is also possible for some portion's of an object's surface to become hidden or for the object to move onto the viewing frustum with little or no geometric error. While the geometric error may be small, the changes in visibility can cause significant changes in the fidelity of the output image.

SUMMARY OF THE INVENTION

The invention provides new methods for measuring the fidelity of transformed images in a layered graphics rendering pipeline. The types of fidelity measurements (called fiducials) include: sampling, visibility and lighting fiducials. We use these fiducials to independently control the image quality of parts of an animated 3D graphics scene. The sampling, visibility and lighting fiducials can also be used in other 3D graphics rendering applications as well.

In our layered 3D graphics rendering pipeline, the fiducials measure the distortion of transformed image layer and help indicate when a scene element should be re-rendered rather than approximated using a 2D transform or color warp. The layered graphics pipeline factors a 3D scene into scene elements and renders these scene elements into separate image layers. To reduce rendering overhead, the pipeline computes a 2D transform that approximates the change in position of a scene element from the frame when the scene element is initially rendered to a later frame. The sampling, photometric and visibility fiducials measure the distortion of a transformed image layer. Once computed for a given frame, the fiducials determine whether the pipeline should re-render the scene element for the frame or re-use the initial rendering by transforming it to simulate its current position or color in the frame.

The sampling fiducial computes distortion by determining how the 2D transform distorts horizontal and vertical axes of an image sample when transformed to output coordinates. For some types of 2D transforms, such as an affine transform, the sampling distortion of an image layer can be computed using a single image sample. For other types of transforms, such as a perspective transform, the sampling distortion of a transformed image can be measured by computing the sampling distortion of image samples at various locations across the image layer. The sampling distortion can be used to determine whether a scene element should be re-rendered for a current frame in an animation sequence. In addition, the sampling distortion can indicate whether the spatial resolution of the image layer should be increased or decreased. Thus, it can control not only the update rate of an image layer, but also the spatial resolution at which the pipeline renders the layer.

The visibility fiducial computes distortion by determining how the visibility of a scene element changes from the time of the initial rendering of the scene element to a current time. One way to measure the change in visibility is to compute the transitions of back-facing to front-facing surfaces between the time of the initial rendering and the current frame. Another way is to track the position of clipped points to determine when parts of a scene element move into the screen boundaries of the display. This approach particularly applies to graphics pipelines that extend the viewing frustum beyond the screen boundaries so that parts of an object will be rendered even though they are not currently visible. Extending the viewing frustum makes it more likely that an initial rendering of a scene element can be re-used as it moves in and around the screen boundaries. Like the sampling fiducial, the visibility fiducial can be used to determine whether to re-render a scene element or re-use an initial rendering.

The photometric fiducial can be used to estimate the photometric error in a transformed image layer. An initial rendering of a scene element can be transformed using a 2D geometric transform, a color warp, or both. The 2D transform approximates the motion of the scene element from the time of the initial rendering to a later time but does not modify the color values in the image layer. The color warp, on the other hand, modifies the color values in the image layer to approximate lighting changes. Both types of warps can be used to approximate the change in the appearance of a scene element over time (e.g., from frame to frame).

The photometric fiducial can either represent the difference between current color values of a scene element and the warped color values (i.e., photometric error with color warp) or just the difference between color values from the initial rendering time to the current time (i.e., photometric error without color warp). Our method for measuring fidelity encompasses a number of alternative ways of measuring lighting changes. One way to compute photometric distortion is to sample the lighting change at characteristic points of the scene element, located either at the surface of the scene element, at the surface of characteristic geometry (such as a bounding polyhedron or sphere), or at some other location associated with the element (e.g., the object's center). Another way to compute photometric error is to measure the change in position of the light source relative to a scene element. This may include measuring change in the angle and distance of the light source relative to the object's center and also measuring the change in the position of the viewpoint.

The photometric error of approximating change in lighting with a color warp can be measured using similar methods. One specific method is to measure the difference between warped color values and current color values at characteristic points of a scene element. This indicates how accurate the color warp models the change in lighting at selected points. An another alternative is to measure the photometric error without the color warp of a sprite and use the color warp if the photometric error is below a threshold. This approach does not directly measure the error of the color warp, but instead, just assumes that the color warp can reduce the photometric error of the sprite without the color warp.

The sampling, visibility, and photometric fiducials can be used alone or in combination with geometric fiducials to determine whether to re-render a scene element for a current frame. The fiducials improve the quality of the output image because they provide new ways to measure artifacts that are not detectable merely using the geometric fiducial. In addition, they can be used to determine how to allocate rendering resources more efficiently.

Further advantages and features of the invention will become apparent with reference to the following detailed description and accompanying drawings.

BRIEF DESCRIPTION OF THE DRAWINGS

FIG. 1 is a diagram illustrating a conventional graphics rendering pipeline.

FIG. 2 is diagram illustrating a layered graphics rendering pipeline.

DETAILED DESCRIPTION

Figure 3:
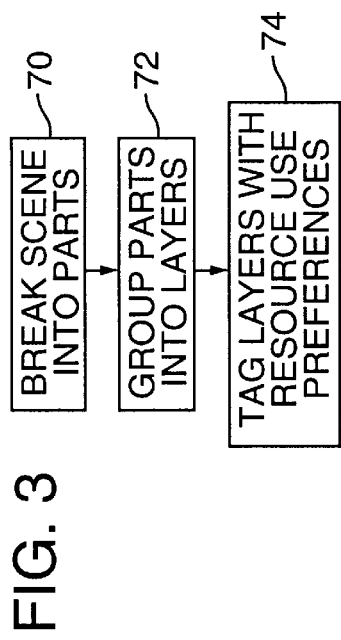
FIG. 3 is a diagram illustrating a method for rendering a scene to separate image layers.

FIG. 2 is a diagram depicting a layered graphics rendering pipeline 30. Like a traditional frame buffer approach, the input to the pipeline is a 3D scene 32 describing the position and visual attributes of the graphical objects in the scene. The output 34 is a rendered digital image comprising a two-dimensional array of pixel values. Unlike the traditional frame buffer approach, the layered pipeline splits the scene into separate layers (e.g., 36 and 38), each with independent quality parameters 40–42, and can render these layers at independent spatial and temporal resolution. The spatial resolution refers to the dimensions, in pixels, of the rendered image layer, while the temporal resolution refers to the rate at which the pipeline re-renders a particular layer.

In a layered pipeline, the spatial resolution of each of the layers can differ from each other and from the resolution of the output image. For example, the pipeline can render a background or blurry object at a lower resolution, and then scale the rendering to screen coordinates for display. While the number of geometric primitives (e.g., polygons) needed to render this type of object stays the same, the renderer uses fewer pixel fill operations to render the layer.

The temporal resolution of each of the layers can also vary from one another and from the display update rate. The display update rate, sometimes called the display refresh rate, is the rate at which the display controller scans an output image to the display device. In a traditional frame buffer approach, it is possible to re-draw the contents of the frame buffer at a different rate than the update rate of the display, but the entire scene is usually re-rendered to compute a new output image at the same rate. In a layered pipeline, each of the layers that make up a particular output image can be rendered at different rates and stored (e.g., cached) as separate layers. One distinction between the conventional architecture and the layered pipeline is the rate at which the elements in the scene are updated. In the conventional architecture, rendering of geometry and shading terms occurs at a fixed rate, the rate at which a new output image is generated. In a layered pipeline, independent layers representing geometry or shading terms are rendered at independent rates. The rate at which the output image is assembled can vary from the updates of the individual layers in the output image.

Depending on the design of the compositor in the layered pipeline, it is possible to compose and scan out a portion of the output image as needed. Once the system has rendered the image layers, the compositor can compose a scanline or a scanline band at a time by combining only rendered layers that impinge on the current scanline or band. Since the layers are rendered and cached independently, the rate at which a new output image is composed can be independent of the individual update rates of the layers.

As an example of layers with independent temporal resolution, consider a scene with fast moving foreground objects and static objects in the background. It is not necessary to re-render static objects, especially if the view point does not change significantly. In addition, it is not necessary to re-render terms of a lighting expression for every frame if those terms do not change significantly from frame to frame, even if other terms in the same expression have changed. Thus, static or re-usable layers can have a different update rate from layers that change substantially from frame to frame.

In FIG. 2, the input 32 to a layered pipeline includes the set of 3D objects in the scene, and the position of objects, light sources, and the viewpoint for the scene. In the context of animation, the position of objects, light sources and the viewpoint can be time-varying, in which case, the position of these scene elements are represented as functions of time. The 3D scene also includes shading or lighting models that can apply to individual objects or several objects in the scene. The scene can also include 2D elements such as texture maps. We use the term shading model to broadly encompass illumination models, lighting models and shading models. Since the layered pipeline can render layers at different rates, it can sample the position of the graphical objects and time varying terms in the shading models at different rates.

The splitter 44 shown in FIG. 2 represents the step of factoring the scene into separate layers. This stage splits the scene into scene elements 46, 48 and their associated quality parameters 40, 42. The scene elements 46, 48 represent geometry and/or terms in the shading expression that will be rendered to a separate image layer called a sprite 50, 52. A scene element typically comprises a series of geometric primitives or polygons that form a graphical object or part of a graphical object in a graphics scene. The quality parameters 40, 42 represent texture level of detail and geometry level of detail, as in a conventional frame buffer architecture. In addition, they can include the temporal resolution, spatial resolution, and metrics (also called fiducials) that the graphics pipeline uses to regulate the fidelity of the image layer. For example, one metric used to regulate the temporal resolution is the position metric, which measures the difference in position of characteristic points on a warped sprite relative to the characteristic points generated from the object model in screen coordinates. This metric regulates temporal resolution because it indicates when an object can no longer be accurately represented by re-using a sprite and needs re-rendering.

The splitter 44 also determines the layering order of the sprites relative to each other. To superimpose a partially transparent foreground object onto a background object, for example, the layering order 54 includes the depth order of the objects and the Over image operator to be used to combine the layers depicting the foreground and background objects.

For more sophisticated shading models, the layering order can also include a description of the relationship of the factored layers that correspond to the term in the shading model. This relationship is typically in the form of an equation describing a linear combination of terms of the shading model with respect to the factored layers and the image operator or operators used to combine these layers. Just like a mathematical equation, the terms of the shading model typically have some inter-dependence, such as a requirement that they be combined in a particular order. Thus, the layering order includes this inter-dependence and is used to convey this information to the compositor.

The author of the scene can perform the splitting step manually, or it can be automated based on some author-specified criteria, some criteria pre-programmed into the system, or some adaptive criteria based on the regulation of the rendering resources. The objective of this stage is to factor the scene into elements that the system can render at independent spatial and/or temporal resolution. The scene can be factored based on geometry, the shading model, or a combination of both. For example, a fast moving car, its shadow, and a reflection in the window can be separate from each other and the slow moving background. We sometimes refer to the function of splitting the scene as factoring. Below we describe factoring of geometry and the shading model in more detail.

As illustrated in FIG. 2, each of the independent scene elements have a corresponding renderer 56, 58. The diagram of the renderers 56, 58 represents that the scene elements are rendered independently. It does not mean that the layered pipeline requires multiple parallel renderers to render each layer, although that is one way to implement a layered pipeline. It is possible to render each layer using the same renderer repeatedly, in which case, the renderers shown in FIG. 2 represent iterations through a single renderer. The renderer(s) can be implemented using a conventional architecture, using either a conventional software or hardware renderer.

To support a layered pipeline, the renderer should be able to render and store image layers separately, and should be able to devote some of its pixel fill capacity to composite the image layers into a final output image. This does not mean, however, that the pipeline must have a separate renderer and compositor. Layer composition can be emulated with rendering hardware that supports texture-mapping with transparency. To emulate the layered pipeline in this type of hardware, the renderer first converts an independent scene element to a texture, and then acts as a compositor by using texture mapping to combine the texture with another image layer.

One architecture specifically adapted to render parts of scene to separate layers is the rendering system described in U.S. Pat. No. 5,867,166 to by Nathan P. Myhrvold, James T. Kajiya, Jerome E. Lengyel, and Russell Schick, entitled Method and System for Generating Images Using Gsprites, filed on Jun. 27, 1996, which is hereby incorporated by reference.

The output of each rendering is a sprite 50, 52. A sprite is a 2D rendering represented in sprite coordinates. It is important to note that sprite coordinates can be different from the screen coordinates. For example, a sprite may be rendered at a different spatial resolution than its display resolution. Also, the 2D sprite coordinates of a layer may have a different orientation than screen coordinates based on how a particular screen element is fit into the sprite's screen boundary. For example, a sprite may be warped (e.g., rotated, affinely warped) relative to screen coordinates to minimize the sprite area that does not overlap the object(s) assigned to the sprite. Also, once rendered, a sprite can be warped to approximate 3D motion or color changes at subsequent sampling times (e.g., for subsequent frames). Rather than re-render the sprite, the renderer may update the sprite's transform instead by computing a warp that approximates its appearance at a later sampling time.

In a layered pipeline, the sprite transform can be specified as input to the system, and it can be computed/updated in the renderer. As explained in further detail below, the graphics pipeline computes the sprite transform in two different cases 1) when a scene element is rendered to compute the initial transform from sprite space to screen coordinates; and 2) when the renderer updates the transform to approximate the sprite in a current frame without re-rendering.

The compositor 60 represents the stage in the rendering pipeline that combines the sprites or parts of the sprites to compute final pixel values for the output image. The compositor receives the sprites and the layering order as input, and combines pixels in the sprites at corresponding screen coordinates into final pixel values.

Since a sprite's coordinates are typically not the same as screen coordinates, the layered graphics pipeline has to transform each sprite to screen coordinates. In the high level architecture illustrated in FIG. 2, the compositor represents the portion of the system that transforms sprites to output coordinates and combines transformed pixel values to compute output pixels in the output image.

The compositor combines sprites using one or more image operators implemented within the compositor. This can include the standard Over operator, an Add operator, a Multiply operator and possibly other image operators.

The Over image operator can be defined as follows. Let A=[$\alpha$A, $\alpha$] be a first layer, and B=[$\beta$B, $\beta$] be a second layer, where A is the color and $\alpha$ is the coverage for the first layer, and B is the color and $\beta$ is the coverage for the second layer, then the Over operator can be computed in the compositor as A Over B=[$\alpha$A+(1−$\alpha$)$\beta$B, $\alpha$+(1−$\alpha$)$\beta$].

The Add operator ("+") adds each sample in a first layer with a sample at a corresponding location in another image layer. The Multiply operator multiplies each sample in a first layer by a coefficient at a corresponding sample location in another layer. In addition to these operators, there are a number of conventional image operators for combining images as set forth in Compositing Digital Images, by Thomas Porter and Tom Duff, SIGGRAPH 1984, pp. 253–259. Any or all of these image operators can be implemented in the compositor to support shading operations.

The compositor can be implemented using special purpose hardware or software code that is independent from the renderer in the graphics pipeline. Alternatively, the renderer can emulate the function of the compositor by allocating some of its pixel fill capacity to combining image layers as explained above.

A layered pipeline decouples compositing of image layers from rendering object geometry. This "decoupling" is advantageous because compositing is inherently less complicated than rendering. Rendering 3D models typically includes a 3D to 2D transformation, hidden surface removal, anti-aliasing, and lighting or shading computations. In contrast, the compositing process involves performing simple image operations on 2D images. As such, a compositor can be implemented with a pixel fill rate that is much higher than the pixel rate of the renderer. While adding a compositor may increase the cost of the system, the compositor offsets this cost by reducing rendering overhead and possibly simplifying the renderer by moving image compositing operators to the compositor.

The layered pipeline has several advantages for real time computer graphics. First, layered rendering makes it easier to re-use renderings from previous frames. As noted above, the temporal resolution of the layers can vary relative to each other. By separating fast moving objects from slower background objects, the layered pipeline improves the usable coherence in the background layers. This reduces the number of geometric primitives that require rendering for each frame and frees up rendering capacity for other objects. This reduction in rendering overhead also frees up pixel fill capacity of the renderer.

Second, layered rendering more optimally targets rendering resources. Less important layers can be rendered at a lower spatial and temporal resolution to conserve resources for important layers. Lowering the spatial resolution for less important objects frees up pixel fill capacity for more important objects. Similarly, lowering the update rate for less important objects frees up rendering capacity (including pixel fill capacity) for more important objects.

Finally, the layered pipeline naturally integrates 2D and 3D. 2D scene elements, such as overlaid video, offline rendered sprites, or hand-animated characters are easily inserted as additional layers. This is critical because many content designers prefer to work in a 2D rather than 3D world.

Factoring

To exploit the advantages of the layered pipeline, the first step is to factor the scene into separate scene elements. Preferably, the scene should be factored to identify scene elements (or sets of scene elements) that can be rendered to separate layers at different update rates and spatial resolution.

Factoring the scene into layers can include both geometry and shading factoring. Below, we describe methods for performing both kinds of factoring.

FIG. 3 is a flow diagram showing steps for preparing models in a graphics scene for rendering in a layered pipeline. The first step 70 is to break the scene into "parts" such as the base level joints in a hierarchical animated figure. The parts are containers for all of the standard graphics elements such as polygon meshes, textures, materials, etc., required to render an image of the part. A part is the smallest renderable unit.

The second step 72 is to group the parts into layers according to the factoring methods described further below. The distinction is made between parts and layers to allow for reuse of the parts, for example in both a shadow map layer and a shadow receiver layer. Layer dependencies must be noted. For example, shadow layers and reflection layers depend on shadow-map layers and reflection-map layers, respectively, to provide depth maps and reflection images.

The final step 74 is to tag the layers with resource-use preferences relative to other layers in the scene. The preferences are relative so that total resource consumption can change when the total resources available for rendering change.

Geometry Factoring

Geometry factoring should consider the following properties of objects and their motions:

1. Relative velocity
2. Perceptual distinctness
3. Ratio of clear to "touched" pixels Relative velocity A sprite that contains two objects moving away from each other must be updated more frequently than two sprites each containing a single object. Velocity also generalizes to dimensions such as shading.

Figure 4A:
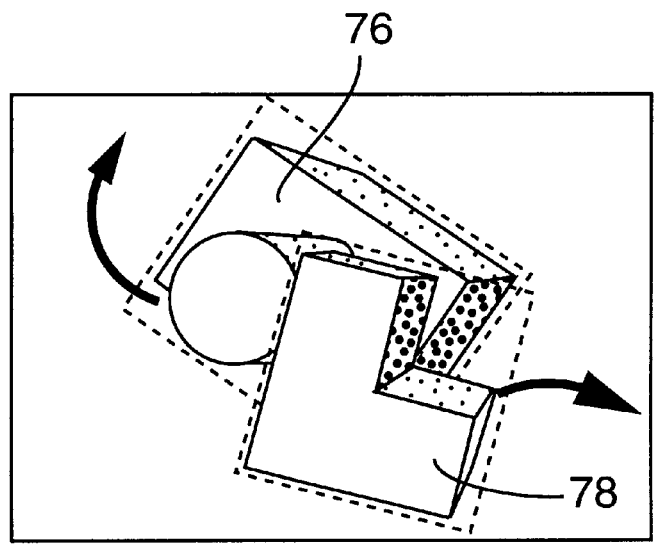
FIGS. 4A–C are examples illustrating how object geometry is assigned to image layers.
Figure 4B:
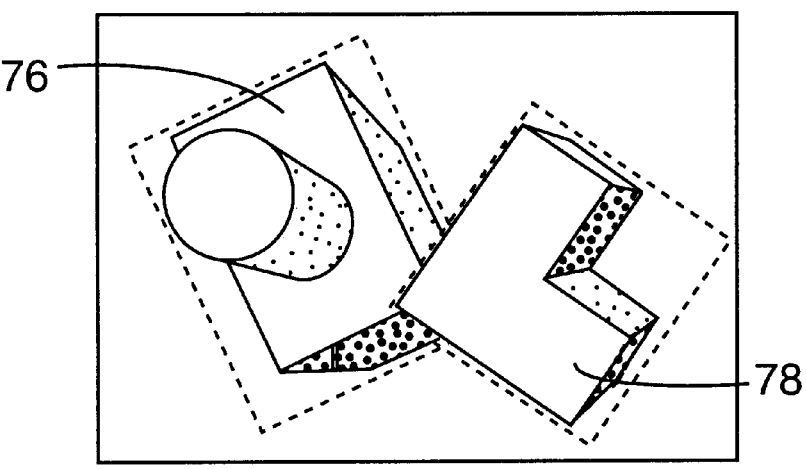
Figure 4C:
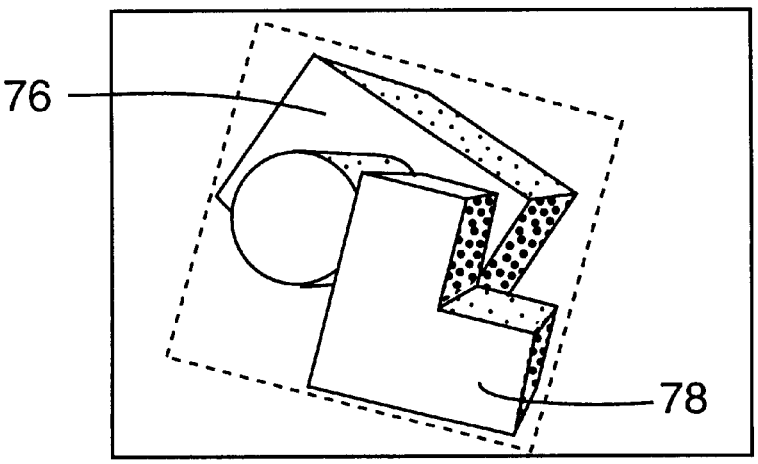

FIGS. 4A–C show a simple example demonstrating the benefits of assigning objects that have different velocities to different sprites. FIG. 4A shows objects 76, 78 assigned to separate sprites and their respective velocities. The dashed lines represent the screen boundaries of the sprites for each object, and the solid arrows show the velocities. Each sprite is a 2D array of sprite samples (pixel values) and has an associated sprite transform that maps the sprite samples to screen coordinates. In this example, the two objects are moving away from each other, and therefore, are assigned to separate sprites.

FIG. 4B shows these objects and their sprites in a subsequent frame of animation. Note that splitting the objects to separate layers improves the likelihood that each sprite can be re-used in subsequent frames because the appearance of the objects in each sprite does not change substantially from FIG. 4A to FIG. 4B. In contrast, aggregating both objects in a single sprite as in FIG. 4C will force the graphics pipeline to re-render the sprite at a higher rate as the objects within the aggregate sprite move away from each other because the motion of the objects can not be accurately represented with a 2D warp.

Perceptual distinctness

Background elements should be blurred by using a lower sampling rate. The main actor requires more samples in space and time. In order to make such tradeoffs, perceptually distinct objects must be separated into layers.

Ratio of clear to "touched" pixels

Aggregating many objects into a single layer typically wastes sprite area where no geometry projects. Finer decompositions are often tighter. Reducing wasted sprite space saves rendering resources especially in a chunked architecture where some chunks can be eliminated. More importantly, it makes better use of the compositor, whose maximum speed limits the average depth complexity of sprites over the display.

Factoring Shading

A shading model can also be factored into separate layers and combined using one or more image operators. In a layered pipeline, the shading model can be factored over an object or a set of objects in a scene rather than globally across the entire scene. The objective is to factor the shading model into layers to take advantage of temporal coherence and more effectively target rendering resources.

The extent to which the shading model can be computed using image operators on image layers depends, in part, on the capabilities of the compositor to combine images and accumulate intermediate results. The factors of the shading model are limited by the types of image operators supported in the compositor, and by the ability of the compositor to accumulate intermediate results. For example, if the compositor only supports the Over operator, the shading model can only be factored in ways in which the Over operator can be used or adapted to combine the factored terms. In addition, if the shading model is factored into terms that need to be stored as intermediate results, the compositor should be able to accumulate intermediate results in one or more buffers.

Using a compositor that supports the standard Over image operator, any shading model with terms combined with the Add ("+") or Over operator may be split into separate layers. Also, the Over image operator can be adapted to approximate a multiply operator (multiplying an image by an array of shadow attenuation coefficients, for example).

Rather than use the Over operator only, the compositor can be designed to support additional image operators, such as the multiply operator, so that it can perform a wider variety of image operations more accurately. One important application of the multiply operator is for multiplying a sprite representing a fully illuminated scene element by a sprite representing an array of attenuation coefficients. For a fast-moving shadow on a slow-moving receiver, the layered pipeline can save rendering resources by only updating the fast-moving shadow and re-using sprites representing the receiver.

As examples of factoring the shading model, consider shading models for shadows and reflections. Shadows and reflections may be separated into layers, so that the blend takes place in the compositor rather than the renderer. To take advantage of temporal coherence, highlights from fast moving lights, reflections of fast moving reflected geometry, and animated texture maps should be in separate layers and rendered at higher frame rates than the receiving geometry. To take advantage of spatial coherence, blurry highlights, reflections, or shadows should be in separate layers and given fewer pixel samples.

Reflection terms can be split into layers because the reflection term is simply added to the rest of the terms in the shading model. Thus, a compositor that supports an Add operator for image layers can be used to combine a reflection layer with other layers in the shading model. Specifically, a compositor supporting the Over operator can add image layers together by setting $\alpha$ to zero so that the Over operator is equivalent to an ADD operation.

The separation of shadow layers is different than reflection layers because the shadowing term multiplies each term of the shading expression that depends on a given light source. This multiply operation can be supported by a Multiply operator in the compositor or can be approximated using the Over operator as explained in further detail below.

Figure 5:
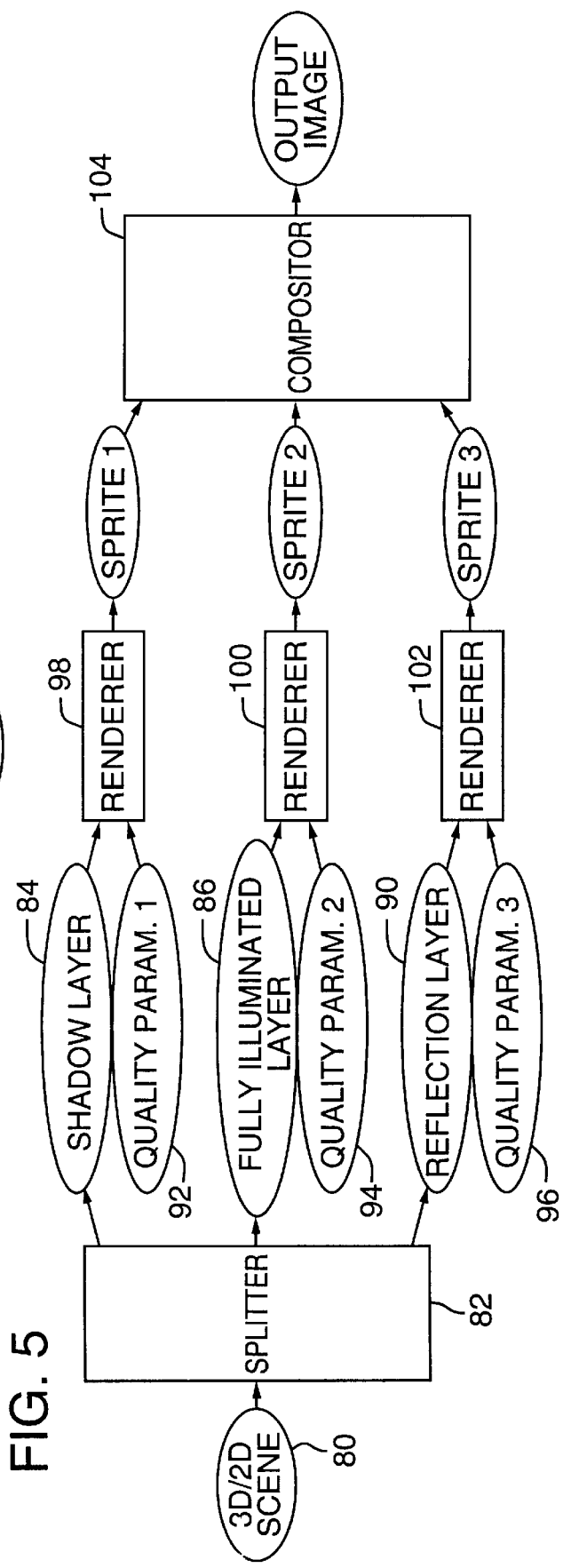
FIG. 5 is a diagram of a layered pipeline for rendering terms in a shading model to separate image layers.

Consider the example used in the background where a shadow layer modulates the fully illuminated scene, and a reflection layer adds a reflection. As shown in FIG. 5, this type of shading model can be factored into at least three layers: the shadow layer, the fully illuminated layer, and the reflection layer. The scene 80 includes the geometric and shading model. The splitter 82 represents the step of factoring the shading model into three layers 84, 86, 90, each with independent quality parameters 92, 94, 96.

The renderer 98 independently renders the shadow layer to sprite 1. Rendering the shadow layer includes rendering the scene from the perspective of the light source to generate a depth map, and then rendering from the perspective of the viewpoint to determine the shadow attenuation coefficients using the depth map. The shadow layer can be computed at a different resolution from the screen resolution and can be re-used for more than one frame.

The renderer 100 independently renders the fully illuminated layer by rendering a fully illuminated scene from the perspective of the viewpoint. The result of this rendering step is Sprite 2. In a typical case, the splitter will separate geometry first, and then lighting passes because different geometric objects usually have different lighting models. Thus, there often are one or more shading layers for each of the geometric layers.

The renderer 102 independently renders the reflection layer by rendering the scene from a reflected camera. The result is Sprite 3.

After the renderer renders Sprites 1–3, the compositor 104 can combine them using an image operator according to the shading model. In the present example, the compositor completes the shadowing operation by multiplying sprite 2 representing the illuminated scene by sprite 1 representing the shadow layer and then adding the reflection layer.

As another example, consider a shading model with two textures and a shadow, $S(N \cdot L)(T_1+T_2)$ where S is the shadowing term, N is the normal to the light, L is the light direction, and $T_1$ and $T_2$ are texture lookups. This shading model can be factored into three layers: S, $(N \cdot L)T_1$, and $(N \cdot L)T_2$, which are composited to produce the final image. Each of these factors can be rendered to separate layers, at different sampling resolutions in space and time, and interpolated to display resolutions. To construct an output image, the compositor adds the second and third layers together with an Add image operator and then multiplies the result by the shadow layer using a Multiply image operator.

To summarize, terms in the shading model can be factored to image layers, rendered independently, and then combined using image operators. The image layers represent the terms in the shading model such as:

1) a shadowing term (called the shadow layer or image), modeling shadows cast by shadowing objects on shadowed objects,
2) a lighting term representing a rendering of an object illuminated by a light source (multiple light sources can be factored to separate lighting terms and added together),
3) a texture layer, representing a rendering of a texture mapped to an object's surface, and
4) a reflection term, modeling the reflection of one object on the surface of another.

Image layers can also represent combinations of these terms, such as a rendering of an object, illuminated by a light source and created using a texture look-up.

Use In Authoring Tools

Factored shading expressions are useful in authoring. When modifying the geometry and animation of a single primitive, the artist would like to see the current object in the context of the fully rendered and animated scene. By pre-rendering the layers that are not currently being manipulated, the bulk of the rendering resources may be applied to the edited layer or layers. The layers in front of the edited layer may be made partially transparent (using a per-sprite alpha multiplier) to allow better manipulation in occluded environments. By using separate layers for each texture shading term, the artist can manipulate the texture-blending factors interactively at the full frame rate. This enables the author to make changes to the attributes of an object, such as changing a blend factor, and then immediately view how the change in the blend factor changes the appearance of the object in an animation sequence.

For shade sprites, the blend factors are the weights in the shading expression. For example, if there are two textures in a shading expression such as D (a1 T1+a2 T2), then the expression is factored into two layers a1(D)(T1) and a2(D)(T2) with the two weights factored out as the per-layer alpha multipliers. Once factored from the shading expression, the user of the authoring tool can modify the weights a1 and a2 in real-time. For example, the user can make changes to the blend factor and then playback the animation sequence. During playback, the authoring tool only has to render the layer or layers being edited.

For geometry sprites, the alpha multiplier may be used to make all the sprites in front of the edited layer be partially transparent. This enables the user to observe how the edits to the object affect the appearance of the object during playback of the animation sequence.

The layers that the user is not currently editing may be either shade sprites or regular geometry sprites. The key idea is that the other layers do not have to be re-rendered. Instead, the layers are just re-composited. All of the rendering resources can be applied to the current object being edited.

An authoring tool that allocates rendering resources to layers being edited by the user and that combines the edited layers with pre-rendered layers can be implemented in the layered graphics rendering pipeline described below. Specifically, the sprite compositor described below can be used to combine pre-rendered image layers with currently rendered layers representing an object being rendered.

Image Rendering

In the layered pipeline, image rendering is the process of creating image layers corresponding to the factored geometry and shading terms. Once created, each image layer can be warped to approximate changes in corresponding geometry or shading terms from one frame to the next. The term "warp" includes not only scaling, translation, and rotation, but also more generally to an affine transform or perspective transform. The warp may also include bilinear or quadratic transformations, and piecewise versions of any of these types of transformations.

To independently control the rendering of independent layers, the layered pipeline needs to manage the object geometry assigned to independent layers. It can perform this layer management using bounding volumes of the layer's geometry and characteristic points that give an approximation of the motion of the geometry over time. The layered pipeline has a graphics preprocessor that performs sprite management functions including:

1) computing sprite transforms mapping sprites to output coordinates, tracking changes in sprites from frame to frame,
2) computing warps to approximate changes in sprites without re-rendering,
3) computing the fidelity of warped sprites, and
4) regulating rendering resources.

In the description to follow, we address each of these functions. To compute the sprite transform, the preprocessor computes the size and orientation of the sprite based on the bounding volume, and determines how the sprite maps to screen coordinates. The preprocessor projects the vertices of the bounding volume to the screen and then fits a quadrilateral (preferably a rectangle) around the 2D projection. The preprocessor then derives the sprite transform from the edges of the quadrilateral.

The preprocessor uses the characteristic points to compute a 2D image warp for the sprite and to determine whether this warp is sufficiently accurate to approximate motion of the object. If the warp is sufficiently accurate, the preprocessor updates the sprite transform with the warp. If not, the preprocessor adds the sprite to a list of sprites requiring re-rendering. We address ways to adjust a sprite's spatial resolution and update rate to regulate the use of rendering resources in more detail below.

Tracking Object Geometry

Our implementation of the layered pipeline tracks the motion of the original geometry using a characteristic bounding polyhedron, usually containing a small number of vertices. For rigidly moving objects, the vertices of the characteristic polyhedron, called characteristic points, are transformed using the original geometry's time-varying transform. Non-rigidly deforming geometry are tracked similarly by defining trajectories for each of the characteristic points.

Figure 6:
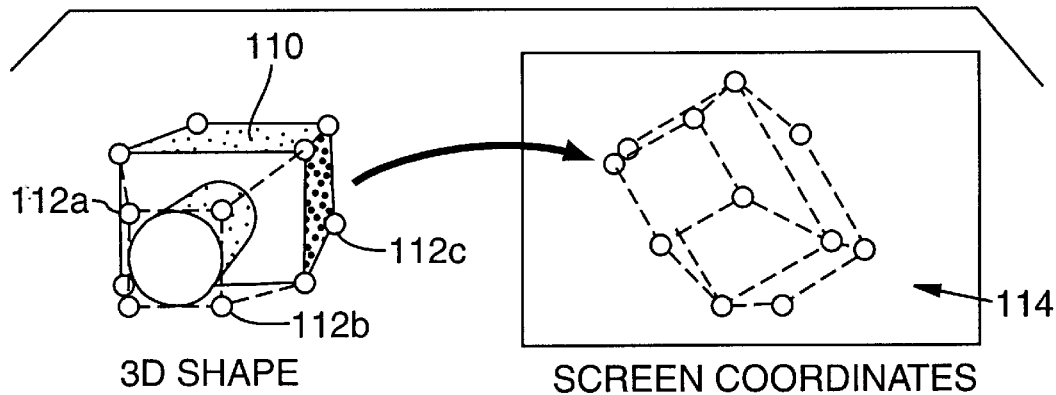
FIG. 6 illustrates an example of a characteristic bounding volume to compute the position and orientation of an object's sprite on a display screen and to track the motion of the object.

FIG. 6 illustrates an example of the characteristic bounding polyhedron of an object 110. In FIG. 6, the vertices of the characteristic bounding polyhedron are represented as small circles (e.g., 112a–c), and the dashed lines connecting the vertices form its surface polygons. The transform T maps these vertices to screen space 114. Note that the characteristic bounding polyhedron matches the overall shape of the original object 110 but has many fewer vertices.

The bounding polyhedron for an object can be computed and stored with the object's model at authoring time or can be computed from the model at rendering time. Rigid bodies can be grouped by combining the characteristic bounding polyhedra, or by calculating a single bounding polyhedron for the whole.

Sprite Extents

For a particular frame, there is no reason to render off-screen parts of the image. But in order to increase sprite reuse, it is often advantageous to expand the clipping region beyond the screen extents to include some of this off-screen area. When the preprocessor computes the size and orientation of a sprite, it clips the sprite's bounding volume to the clipping region. Extending the clipping region expands the size of sprites overlapping the extents of the clipping region. While this initially can increase rendering overhead, it later reduces it by increasing the chances that a sprite can be re-used as it moves onto the screen.

Figure 7A:
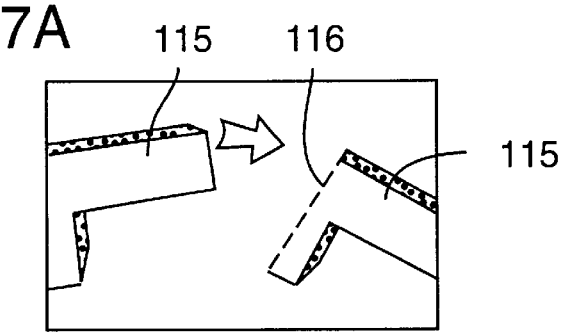
FIGS. 7A–B illustrate how to expand the viewing frustum beyond the screen area to increase the sprite extents and make rendered sprites more likely to be re-usable.

FIG. 7A shows how clipping a sprite to the screen (solid box) prevents its later reuse because parts of the clipped image later become visible. This figure shows an object 115 moving across the screen from left to right. The object is rendered initially as it enters the screen on the left. If the object is clipped to the screen extent, it will not be re-usable as it moves to the right because the off-screen section of the object is not initially rendered. The dashed line 116 on the object shows where the object has been clipped.

Figure 7B:
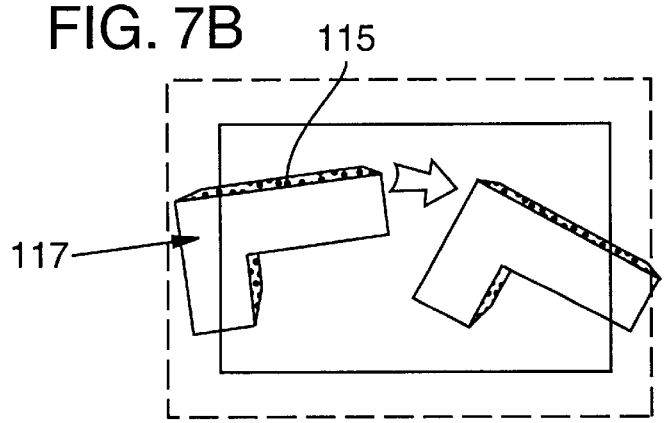

In FIG. 7B, the sprite extent (dashed box) has been enlarged to include regions 117 of the object 115 that later become visible as it moves from left to right. The extra area to include in the sprite extent depends on such factors as the screen velocity of the sprite (which suggests both where and how much the extents should be enlarged) and its expected duration of re-use.

The Sprite Transform

When creating a sprite image, we must consider a new transform in the standard pipeline in addition to the modeling, viewing, and projection transforms: a 2D transformation that transforms samples in sprite coordinates to screen coordinates.

If T is the concatenation of the modeling, viewing, and projection matrices, a screen point p' is obtained from a modeling point p, by p'=T p. For the sprite transformation, p'=A q, where A is an affine transform and q is a point in sprite coordinates. To get the proper mapping of geometry to the display, the inverse 2D affine transform is appended to the projection matrix, so that $q=A^{-1} T p$ results in the same screen point $p'=A q=A A^{-1} T p=T p$.

Figure 8:
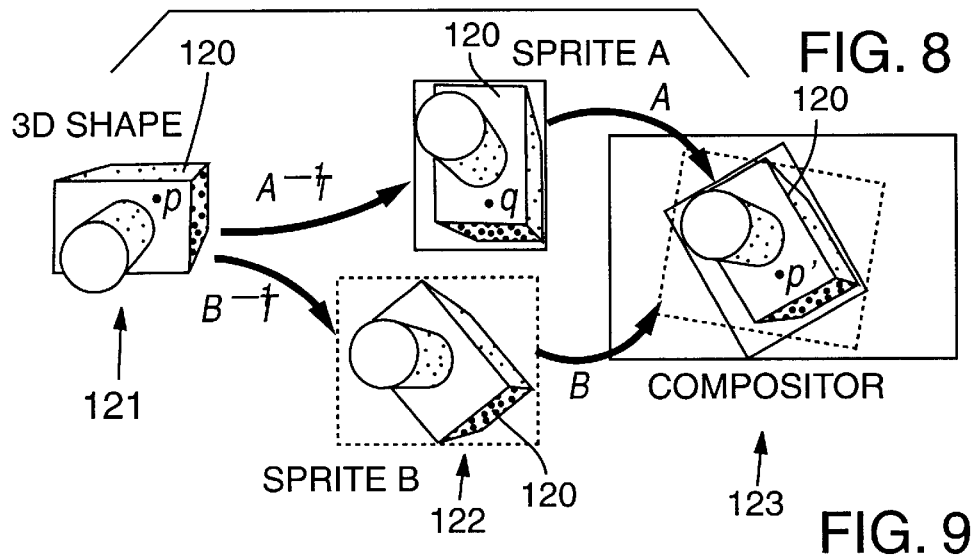
FIG. 8 illustrates two examples of computing a sprite transform to highlight the advantage of finding a tight fitting sprite for a projected object.

FIG. 8 is a diagram illustrating an example of mapping an object 120 from modeling coordinates 121 to sprite coordinates 122, and then mapping the object 120 from sprite coordinates to the screen coordinates 123. In this example, sprite transform A makes a better fit than sprite transform B because the sprite fits much tighter around the object 120.

The choice of matrix A determines how tightly the sprite fits the projected object. A tighter fit wastes fewer image samples. To choose the affine transform that gives the tightest fit, the preprocessor projects the vertices of the characteristic bounding polyhedron to the screen and clips to the expanded sprite extent. Then, using discrete directions (from 2–30, depending on the desired tightness), the preprocessor calculates 2D bounding slabs as set forth in Ray Tracing Complex Scenes, by Timothy L. Kay and James T. Kajiya, SIGGRAPH 1986, pp. 269–278.. Alternately, the preprocessor may choose slab directions by embedding preferred axes in the original model, and transforming the axes to screen space.

Figure 9:
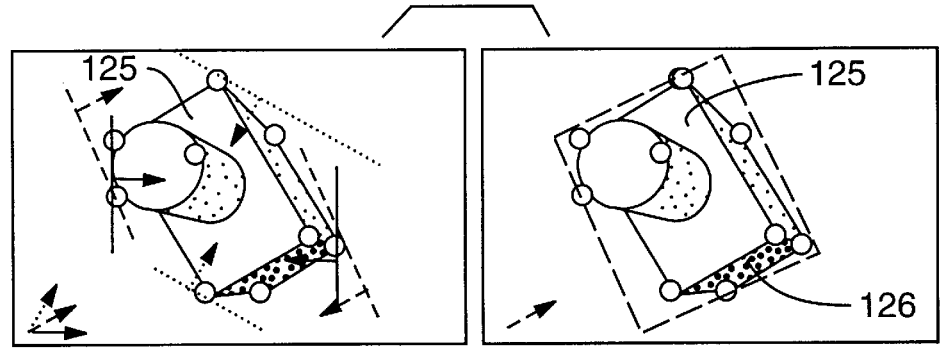
FIG. 9 illustrates a method for computing sprite edges in screen coordinates for a projected shape.

FIG. 9 illustrates how to compute the bounding slabs on a simple object 125. As shown in FIG. 9, bounding slabs are obtained by taking the external values of the dot product of each slab direction with the characteristic points. A tight-fitting initial affine transform can be calculated by taking the minimum area rectangle or parallelogram that uses the slab directions. FIG. 9 shows a bounding rectangle 126 in dashed lines, computed using this approach.

Using the bounding slabs, the preprocessor computes the rectangle with the smallest area that fits the transformed characteristic points. The origin and edges of the rectangle determine the affine matrix. Another approach is to search for the smallest area parallelogram, but this can cause too much anisotropy in the resulting affine transformation.

Spatial Resolution

The choice of affine matrix A also determines how much the sprite is magnified on the display. Rendering using a sampling density less than the display resolution is useful for less important objects, or for intentional blurring. The default is to use the same sampling density as the screen, by using the length in pixels of each side of the parallelogram from the previous section.

Figure 10A:
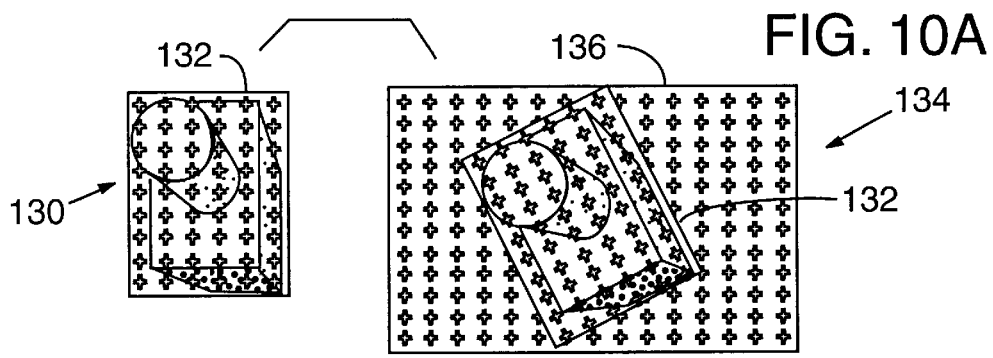
FIGS. 10A–B illustrate how an image layer can be rendered to a different spatial resolution than the screen resolution.
Figure 10B:
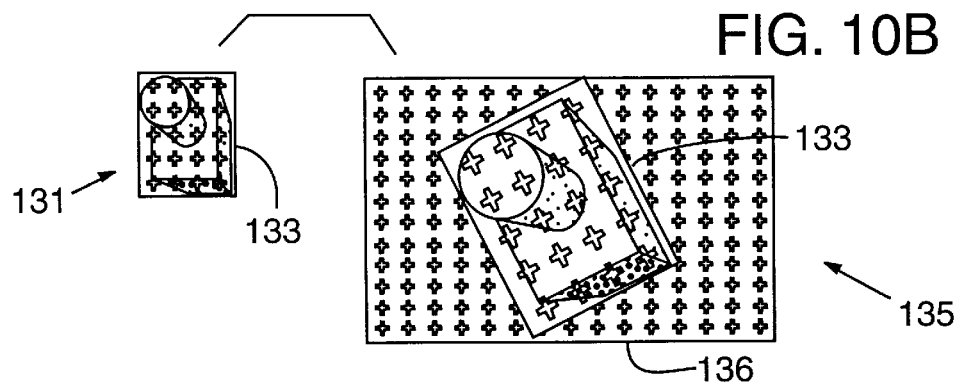

FIGS. 10A–B illustrate two examples demonstrating that the spatial resolution of a sprite representing a rendering of a 3D object may be different from final display resolution. The sampling density of the sprite in FIG. 10A is the same as the screen resolution; and the sampling density of the sprite in FIG. 10B is lower than the screen resolution.

The left side 130, 131 of FIGS. 10A–B shows the object in sprite space, superimposed over sprite coordinates. The boundaries 132, 133 of the sprite on the left and right sides of FIGS. 10A–B are its sprite boundaries or edges. The right side 134, 135 of FIGS. 10A–B shows the sprite and the sprite coordinates within the sprite edges warped to the screen space. The screen boundaries are represented by the solid lines 136 enclosing the array of screen coordinates. Note that the sprite coordinates do not map precisely to integer screen coordinates in either FIG. 10A or 10B. The pixel values at a given pixel location in screen coordinates can be computed using either a forward mapping (sprite to screen coordinates) or backward mapping (pixel to sprite coordinates) and then filtering sprite samples (sprite pixels) to compute pixel values at each screen coordinate within the sprite edges.

The sampling density of the sprite coordinates is the same as the screen coordinates in FIG. 10A, but is lower in FIG. 10B. Rendering the sprite at a lower sampling density uses less pixel fill capacity but introduces more blur, assuming an antialiased rendering.

For a linear motion blur effect, the sprite sampling along one of the axes may be reduced to blur along that axis. The sprite rendering transformation should align one of the coordinate axes to the object's velocity vector by setting the bounding slab directions to the velocity vector and its perpendicular.

Rendering a Scene Element to the Sprite

Once the preprocessor has computed the sprite transform, including the spatial resolution of the sprite, the layered pipeline can then render the scene element(s) assigned to the layer to the sprite. The rendering process can be implemented using conventional 3D graphics rendering techniques, or a chunking architecture as set forth in U.S. Pat. No. 5,867,166.

Image Warps

To reuse a rendered sprite image in subsequent frames, our implementation uses a 2D image warp to approximate the actual motion of the object. The preprocessor in our implementation uses the projected vertices of the characteristic bounding polyhedron to track the object's motion.

Figure 11:
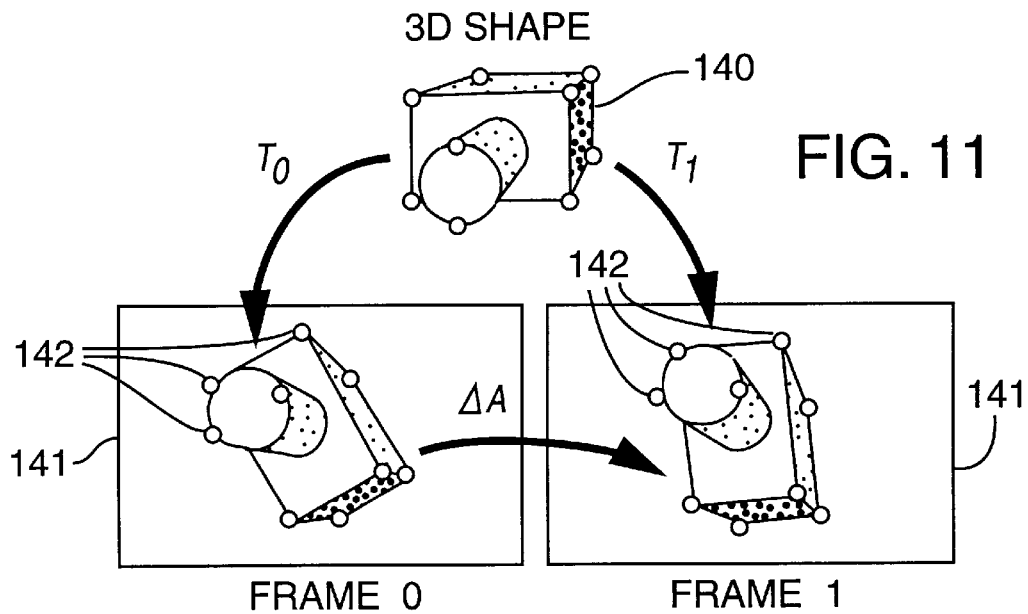
FIG. 11 is a diagram illustrating how to compute a 2D warp to approximate motion of an object from its initial rendering to a later frame.

FIG. 11 is an example illustrating how to use the characteristic points to track the motion of a 3D shape 140 from an initial frame (Frame 0) to a later frame (Frame 1). The transforms, $T_0$ and $T_1$, transform the 3D shape 140 from modeling coordinates to the screen 141 at first (Frame 0) and second sampling times (Frame 1), respectively. The solid circles (e.g., 142) highlight the location of the characteristic points in each of the frames.

Using the transform $T_1$, the preprocessor computes the screen position of the characteristic points in frames 0 and 1 and then computes a transform that warps the same characteristic points from frame 0 to their location in frame 1. The preprocessor projects the characteristic points on the three-dimensional shape to the screen and uses them to derive a transform $\Delta A$ that best matches the original points to the points in the new frame. The solid black circles show the points from frame 0 transformed by $\Delta A$.

To reuse images where objects are in transition from off-screen to on-screen, and to prevent large distortions (i.e., ill-conditioning of the resulting systems of equations), the characteristic bounding polyhedron is clipped to the viewing frustum, which may be enlarged from the display's as discussed above. The clipped points are added to the set of visible characteristic points and used to determine an approximating sprite transformation, using a simple least-squares match discussed further below.

Figure 12:
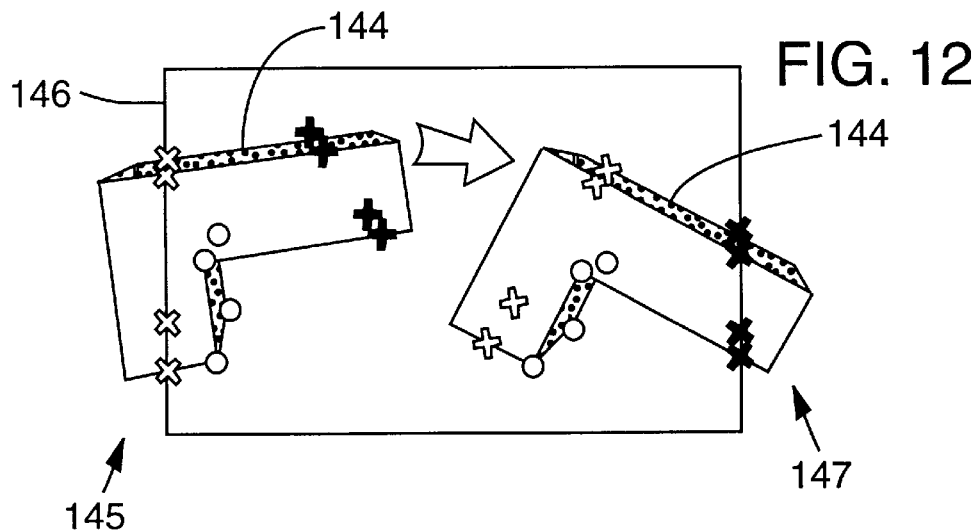
FIG. 12 is a diagram illustrating how an object's characteristic polyhedron is clipped to a viewing frustum and how the clipped points are added to the set of characteristic points used to compute a 2D warp of the object's sprite.

FIG. 12 shows an example of clipped characteristic points on a moving object 144. The left side 145 of the viewing frustum 146 shows the position of object 144 at the time of its last rendering. The clipped points at this sampling time are marked with an X. At the time of the current frame, the object 144 has moved to the right side 147 of the viewing frustum. The clipped points at this sampling time are marked with a bold X to distinguish them from the other clipped points. The set of clipped points from the last rendering and current frame are added to the set of characteristic points and used to compute the sprite transform that approximates the motion of the object.

Affine Warps

A 2D affine transform may be represented by a 2×3 matrix, where the rightmost column is the translation and the left 2×2 matrix is the rotation, scale, and skew.

$$A = \begin{bmatrix} a & b & c \\ d & e & f \end{bmatrix}$$

Let P be the time-varying set of projected and clipped bounding polyhedron vertices, ignoring the z values and adding a row of 1's to account for the translation, $$P = \begin{bmatrix} x_0 & & x_{n-1} \\ y_0 & \cdots & y_{n-1} \\ 1 & & 1 \end{bmatrix}$$

where n is the number of points (at least 3 for the affine transform). Let $\hat{P}$ be the matrix of characteristic points at the initial time and P be the matrix at the desired time t.

In an affine transform, the x and y dimensions are decoupled and so may be solved independently. To solve $A=\hat{P}P$ at time t for the best A, in the least-squares sense, we use the technique of normal equations:

$$A\hat{P}\hat{P}^T = P\hat{P}^T$$
$$A = P\hat{P}^T(\hat{P}\hat{P}^T)^{-1}$$

The technique of normal equations works well in practice, as long as the projected points are reasonably distributed. Adding the clipped characteristic points ensures that $\hat{P}\hat{P}^T$ is not rank deficient. Much of the right hand side may be collected into a single vector K that may be reused for subsequent frames.

$$K = \hat{P}^T(\hat{P}\hat{P}^T)^{-1}$$
$$A = PK$$

The step of calculating K requires the accumulation and inverse of a symmetric matrix.

Other Types of 2D Image Warps

While we have specifically discussed affine transforms to this point, it is also possible to use other 2D image warps to approximate motion of 3D geometry. For example, other possible types of warps include: 1) pure translation, 2) translation with isotropic scale, 3) translation with independent scale in X and Y, 4) general perspective. We experimented with each of these types of warps for a variety of types of rigid bodies including both planar and non-planar examples. We also tried animated trajectories for each body including translations with a fixed camera, translations accompanied by rotation of the body along various axes, and head turning animations with fixed objects. Our experiments attempted to measure: 1) update rate as a function of maximum geometric error, and 2) perceptual quality as function of update rate. The geometric error is the distance between the current position of the characteristic points in screen coordinates and the position of the characteristic points from the last rendering, warped by the sprite transform to screen coordinates.

We ran a number of experiments to simulate each of the 2D image warps listed above, including the general affine warp. In our experiments, a simulator (a programmed computer) computed the update rate for each type of warp using a threshold on the geometric error. If the error of the warped sprite did not exceed the threshold, the simulator re-used the sprite; otherwise, it re-rendered the sprite for the current frame. The simulator computed sprite transforms for each type of warp using two forms of error minimization: minimizing maximum error over all characteristic points and minimizing the sum of squares error. Our experiments confirmed the merit of the affine transform, even relative to the more general perspective transform.

Independent Quality Parameters

Since warped sprites only approximate a fully rendered sprite, we use metrics to measure the fidelity of sprites. We refer to these metrics as "fiducials." U.S. Pat. No. 5,867,166 describes a position metric (which we refer to as a geometric fiducial) and briefly discusses a lighting metric (which we refer to as a photometric fiducial). Here, we recap the geometric fiducial, describe specific lighting metrics called "photometric fiducials," and describe two additional fiducials, sampling and visibility fiducials. In sum, there are four types of fiducials: geometric, photometric, sampling and visibility.

Geometric fiducials measure errors in the screen-projected positions of the geometry. Photometric fiducials measure errors in lighting and shading. Sampling fiducials measure the degree of distortion of the image samples. Visibility fiducials measure potential visibility artifacts.

When measuring the error of approximating motion or shading terms with warped sprites, it is preferable to use conservative measurements where possible. However, heuristic measurements can be used as well if they are efficient and effective. Any computation expended on warping or measuring approximation quality can always be redirected to improve 3D renderings, so the cost of computing warps and fiducials must be kept small relative to the cost of rendering.

Geometric Fiducials

A geometric fiducial is a metric for measuring the difference in position of warped characteristic points and their actual position in screen coordinates for a particular frame. This type of fiducial is described in U.S. Pat. No. 5,867,166, incorporated by reference above. The following description gives a recap of the geometric fiducial.

Let $\hat{P}$ be a set of characteristic points from an initial rendering, let P be the set of points at the current time, and let W be the warp computed to best match $\hat{P}$ to P. Then the geometric fiducial is defined as $$F_{geom} = \max_i \| P_i - W\hat{P}_i \|$$

Figure 13:
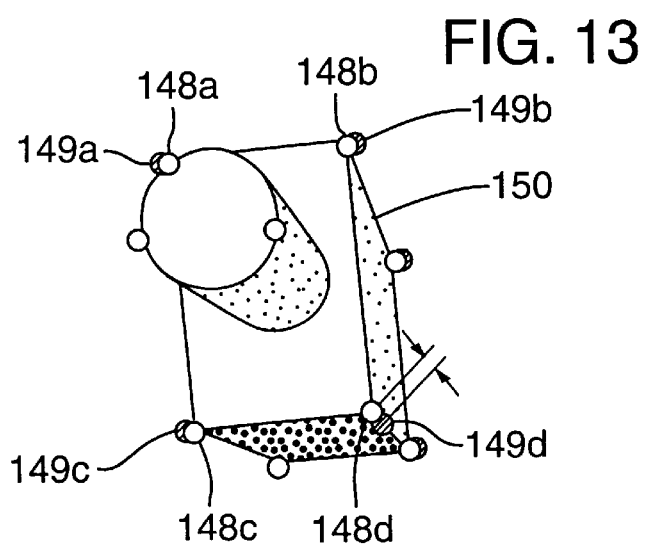
FIG. 13 is a diagram illustrating how to compute a geometric error or "fiducial" at the characteristic points of an object.

FIG. 13 illustrates the geometric error between warped characteristic points 148a–d and corresponding characteristic points 149a–d of an object 150 for the current frame. The warped characteristic points 148a–d are represented as the empty circles while the corresponding characteristic points 149a–d for the current frame are cross-hatched. As shown at points 148d, 149d, the geometric error is the maximum pointwise distance between the warped and current characteristic point.

Photometric Fiducials

Our implementation of the layered pipeline uses two approaches to approximately measure photometric errors. The first approach uses characteristic points augmented with normals to point sample the lighting. Let $\hat{C}$ be the colors that result from sampling the lighting at the characteristic points at the initial time, and C be the sampled colors at the current time. Let $W_C$ be the color warp used to best match $\hat{C}$ to C. Then the shading photometric fiducial is defined to be the maximum pointwise distance from the matched color to the current color.

$$F_{photo} = \max_i \| C_i - W_C \hat{C}_i \|$$

Figure 14:
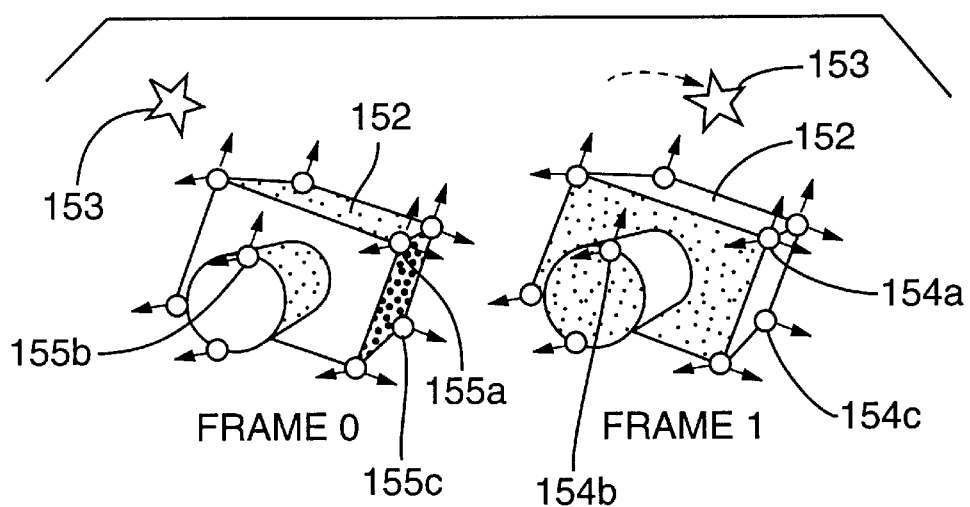
FIG. 14 is a diagram showing one type of photometric fiducial using normals to sample lighting changes.

FIG. 14 illustrates an example of sampling the lighting change on an object 152 as a light source 153 changes position from frame 0 to frame 1. The point-sampled photometric fiducial measures lighting change by sampling the shading at the current frame's characteristic points (e.g., 155a–c) with normals and comparing with samples of the initial frame's characteristic point shading (e.g., 154a–c). In this example, the shading of the object's surfaces changes as the light source changes position from frame 0 to frame 1. The preprocessor in the graphics pipeline detects this change by sampling the shading at the characteristic points.

Another approach is to abandon color warping and simply measure the change in photometry from the initial rendering time to the current. Many measures of photometric change can be devised; the implementation described here measures the change in the apparent position of the light. Let $\hat{L}$ be the position of the light at the initial time and L be its position at the current time (accounting for relative notion of the object and light). For light sources far away from the illuminated object, the preprocessor can be programmed to measure the angular change from $\hat{L}$ to L with respect to the object, and the change in distance to a representative object "center". For diffuse shading, the angular change essentially measures how much the object's terminator moves around the object, and the change in distance measures the increase or decrease in brightness. Light sources close to the object are best handled with a simple Euclidean norm on the source positions. For specular shading, changes in the viewpoint can be measured as well.

Figure 15:
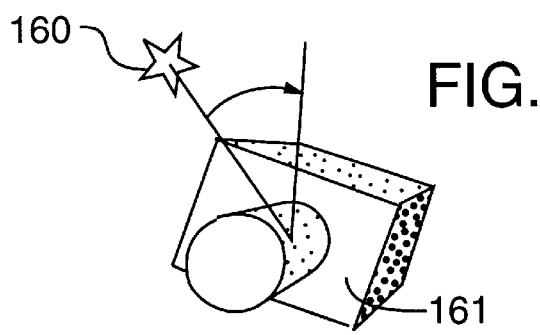
FIG. 15 is a diagram showing a second type of photometric fiducial based on the motion and angle of a light source relative to an object.

FIG. 15 shows an example depicting the change in the position of a light source 160 from frame 0 to frame 1 relative to an object 161. As the angle of the light source changes relative to the object, the surfaces visible and not visible from the light source also change. The angle of the light source, therefore, approximately indicates the extent to which surfaces become illuminated or shadowed as the light source moves. As the light source moves toward or away from the surface of the object, the intensity of the light at the surface also changes. To implement this type of fiducial, the preprocessor places a threshold on the angle and the change in distance of the light source and triggers re-rendering when this threshold is satisfied. Alternatively, the preprocessor can measure the value of the angle and the change in distance and use these values to compute the cost of re-using the sprite relative to FIG. 14 illustrates an example of sampling the lighting change on an object 152 as a light source 153 changes position from frame 0 to frame 1. The point-sampled photometric fiducial measures lighting change by sampling the shading at the current frame's characteristic points (e.g., 154a–c) with normals and comparing with samples of the initial frame's characteristic point shading (e.g., 154a–c). In this example, the shading of the object's surfaces changes as the light source changes position from frame 0 to frame 1. The preprocessor in the graphics pipeline detects this change by sampling the shading at the characteristic points.

Another approach is to abandon color warping and simply measure the change in photometry from the initial rendering time to the current. Many measures of photometric change can be devised; the implementation described here measures the change in the apparent position of the light. Let $\hat{L}$ be the position of the light at the initial time and L be its position at the current time (accounting for relative motion of the object and light). For light sources far away from the illuminated object, the preprocessor can be programmed to measure the angular change from $\hat{L}$ to L with respect to the object, and the change in distance to a representative object "center". For diffuse shading, the angular change essentially measures how much the object's terminator moves around the object, and the change in distance measures the increase or decrease in brightness. Light sources close to the object are best handled with a simple Euclidean norm on the source positions. For specular shading, changes in the viewpoint can be measured as well.

FIG. 15 shows an example depicting the change in the position of a light source 160 from frame 0 to frame 1 relative to an object 161. As the angle of the light source changes relative to the object, the surfaces visible and not visible from the light source also change. The angle of the light source, therefore, approximately indicates the extent to which surfaces become illuminated or shadowed as the light source moves. As the light source moves toward or away from the surface of the object, the intensity of the light at the surface also changes. To implement this type of fiducial, the preprocessor places a threshold on the angle and the change in distance of the light source and triggers re-rendering when this threshold is satisfied. Alternatively, the preprocessor can measure the value of the angle and the change in distance and use these values to compute the cost of re-using the sprite relative to the cost of other sprites.

Sampling Fiducials

Sampling fiducials measure the degree of expansion, contraction, and distortion of the samples of warped sprite. The objective is to measure the distortion of a sprite sample (or sprite samples) as a result of being warped to the screen coordinate space. The sampling fiducial computes distortion by determining how the 2D transform deviates from an isometric map; i.e., how it changes lengths and/or angles between pre-and post-warped tangent vectors. For some types of 2D transforms, such as an affine transform, the sampling distortion is spatially invariant, and can be computed by measuring at a single arbitrary image sample. For other types of transforms, such as the perspective transform, the sampling distortion is spatially varying, and should be measured at various image locations, or conservatively bounded across the relevant image region.

Figure 16:
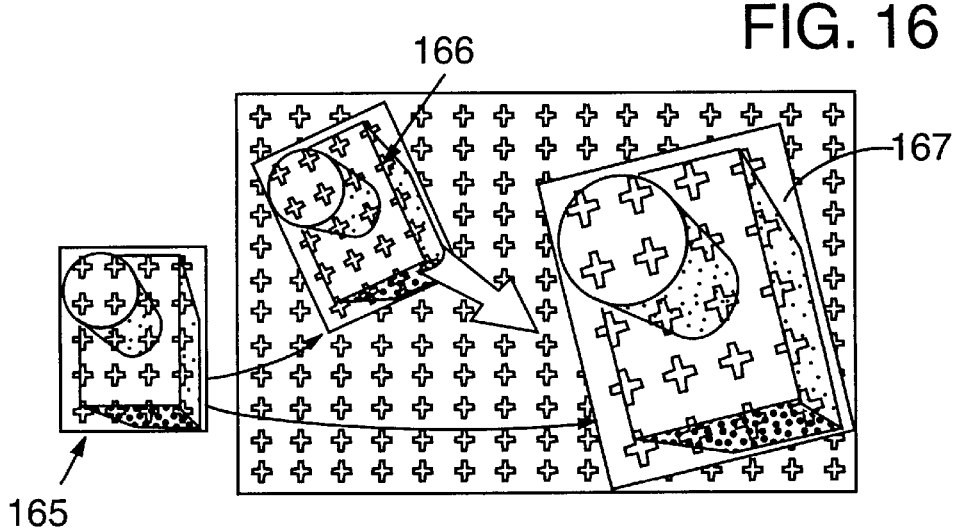
FIG. 16 is an example illustrating sampling distortion and a sampling fiducial.

FIG. 16 shows an example of an image warp where the sampling fiducial is particularly useful for measuring distortion of the warped image. In the example of FIG. 16, the viewpoint is moving closer to an object without changing the lights or the view. The initial rendering of the object to its associated sprite 165 has the same spatial resolution as the screen. The sprite transform at the initial rendering is $A_0$, which maps the sprite to the screen coordinates. FIG. 16 shows the initial rendering 166 in screen space with the sprite samples superimposed over it to show its initial resolution relative to the screen resolution. The sprite transform for a later frame is $A_1$. Note that the warped sprite 167 has a larger spacing between sprite samples.

In this particular example, both the geometric and photometric fiducials indicate the sprite has high fidelity to the desired image. However, the sampling fiducial indicates that the sprite is getting blurry. As the sprite is scaled to cover a larger screen area, the sprite samples get stretched, and this stretching makes the sprite appear blurry even if the geometric and photometric error remain the same.

Scaling a sprite sample to cover a smaller screen area can also cause visual artifacts due to the limitations of the rendering system. Consider the example shown in FIG. 16 with the variation that the object is moving farther away from the viewpoint with a translation and scale. As the screen size of the sprite becomes smaller relative to its size in sprite space, it becomes more difficult to filter sprite samples during the process of mapping the sprite to screen coordinates. In some implementations, filtering capabilities of the hardware limit the amount that sprite images can be "minified" and anisotropically scaled before perceptible artifacts arise.

The sampling distortion of an affine warp can be measured as the distortion of a horizontal and vertical unit vector in sprite space, when warped to screen space. Recall that the affine sprite transform can be represented by the 2×3 matrix A:

$$A = \begin{bmatrix} a & b & t_x \\ c & d & t_y \end{bmatrix}$$

where the rightmost column is the translation and the left 2×2 matrix is the rotation, scale, and skew. The sampling distortion is proportional to the change in length of these unit vectors when the sprite transform is applied to them. Stated more generally, the sampling distortion measures the distortion of a sprite's sampling grid when transformed to output device coordinates.

One specific way to measure this distortion is to compute the singular values of the Jacobian of the mapping function. The affine warp has a spatially invariant Jacobian given by the left 2×2 part of the 2×3 matrix, for which the two singular values are easily calculated. The 2×2 part of the affine transform matrix can be represented as:

$$\begin{bmatrix} a & b \\ c & d \end{bmatrix} = U \begin{bmatrix} S_1 & 0 \\ 0 & S_2 \end{bmatrix} V$$

where U and V are rotation matrices, and $S_1$ and $S_2$ are the singular values computed from the terms, a, b, c, and d. The singular values measure the minimum and maximum length of the result of applying the Jacobian to an arbitrary unit tangent vector. The extent to which these singular values differ from 1 indicates the distortion of a sprite sample. When close to 1, the transform is close to the identity and thus produces no distortion.

One way to quantify the distortion is to compute the magnitude of the larger and smaller singular values, and the ratio of the larger over the smaller value. Our implementation measures the magnitude of the larger singular value (which measures the greatest magnification), the magnitude of the smaller (which measures the greatest minification), and their ratio (which measures the maximum anisotropy). For transforms with spatially varying Jacobians such as the perspective warp, the singular values vary over the image. In this case, a bound for the singular values over the input domain can be computed.

Visibility Fiducials

Visibility fiducials measure potential visibility artifacts by counting the number of back-facing to front-facing transitions in the set of characteristic points, and testing if edges of clipped sprites will become visible. Again, the simplified characteristic geometry makes these calculations tractable.

The back-facing to front-facing transitions approximate the change in visibility of the surfaces on an object from an initial frame to the current frame. To compute these transitions, our implementation compares normal of the characteristic points with the direction of the viewpoint and stores a value indicating whether a surface on the characteristic geometry is front-facing or back-facing. After the initial rendering, the preprocessor repeats this test for the characteristic points at their current position and then determines the change in visibility based on the transitions from back to front-facing relative to the initial rendering. Alternatively, this approach could also count transitions from back-facing to front-facing surfaces.

A modification to this method is to weight each transition by the screen area covered by a characteristic polygon. In this modification, the surface of characteristic geometry corresponds to the surface of a characteristic polygon. By weighting transitions in this manner, transitions of polygons that occupy less screen area will have less impact on the measure of visibility distortion. This is appropriate because the end-user is less likely to notice visibility distortion due to polygons that occupy less screen area.

FIG. 14 illustrates an example of how surface normals can be stored along with characteristic points. To implement the visibility fiducial for this type of model, the preprocessor traverses the list of characteristic points, computes visibility for each surface of the characteristic polyhedron, and then stores a visibility value along with the characteristic points. For the sake of illustration, assume that the light source 153 is the viewpoint and that the viewpoint moves as shown from frame 0 to frame 1. At frame 1, the preprocessor traverses the list of characteristic points, computes visibility, and then compares the current visibility value with the initial visibility value to determine the number of transitions. The number of transitions from back to front facing is one way to quantify the cost of not re-rendering the sprite for the current frame.

Our implementation also uses clipping information as part of the visibility fiducial. As described above, the preprocessor clips characteristic bounding polyhedron to a viewing frustum that extends beyond the screen boundary (the expanded sprite extent). The preprocessor adds the clipped points to the set of characteristic points and uses the clipped points to mark the clipped edge of a sprite. At each subsequent frame, the preprocessor can then check the clipped edge to determine whether it has entered the screen.

Color Warp

As introduced above, color warping can be used in a layered graphics rendering pipeline to reduce rendering overhead by approximating lighting changes of a sprite rather than re-rendering the sprite. Using a "color warp" that operates on color values rather than pixel locations, images can be warped to match photometry changes. To implement a color warp, a pre-processor in the graphics pipeline samples the lighting changes from frame to frame and computes a color warp that modifies the color values of a sprite to approximate these changes.

U.S. Pat. No. 5,867,166 describes a method for computing a color warp to approximate photometry changes. A method for color warping, and implementations of it, are described further below.

Color warping includes three principal steps 1) sampling the lighting change between frames; 2) determining how to modify the color values in the sprite to approximate the lighting change (i.e., compute a color warp); and 3) if sufficiently accurate, performing a color warp on the sprite to approximate the lighting change. If after evaluating the lighting equation the pre-processor determines that the lighting has changed more than a predefined amount, then it instructs the layered graphics pipeline to re-render the object.

In the first step, the rendering system samples the lighting change for an object associated with the sprite. It samples the lighting change between a first frame in which an object is rendered to a sprite, and a subsequent frame in which the rendering system attempts to color warp the sprite to approximate the lighting change. As explained in the section on photometric fiducials, one way to sample the lighting change is to sample the lighting equation at characteristic points with normals for the first frame and the subsequent frame and compare the results of sampling at each of these frames. The characteristic points should preferably be distributed on the object to provide an accurate sampling of the lighting change across the sprite. The specific number and location of characteristic points can vary and is generally model-specific.

One example of lighting equation is:

$$I_\lambda = I_{a\lambda}k_a O_{d\lambda} + f_{att} I_{p\lambda}[k_d O_{d\lambda}(N \cdot L) + k_s O_{s\lambda}(R \cdot V)^n]$$

where:

$I_{a\lambda}$ is the ambient light.

$k_a$ is the ambient reflection coefficient.

$O_{d\lambda}$ is the object's diffuse color.

$f_{att}$ is the light source attenuation factor, which describes how the light energy decreases the farther it travels from a light source.

$I_{p\lambda}$ is the light from a point source.

$k_d$ is the diffuse reflection coefficient, a constant between 0 and 1 that varies from one material to another.

$O_{s\lambda}$ is the object's specular color.

$k_s$ is the material's specular-reflection coefficient, which ranges from 0 to 1.

$(N \cdot L)$ is the dot product between a surface normal N and the direction of the light source L.

$(R \cdot V)$ is the dot product between the direction of reflection R and the direction to the viewpoint V.

the superscript n is the material's specular reflection exponent, which typically varies from 1 to several hundred.

$\lambda$ indicates that a term having this subscript is wavelength dependent. One assumption to simplify the lighting equation is to assume that the RGB color model can sufficiently model the interaction of light with objects. Using this assumption, the lighting model can be applied to each R, G, and B color component.

The lighting equation above is only an example illustrating one method for computing lighting at points on the surface of an object. The lighting equation can be simplified, for example, by disregarding the light attenuation factor or the specular reflection. In the field of 3D graphics rendering, there are a variety of other conventional lighting equations used to model lighting on the surface of a graphical object. Therefore, any of a number of different lighting equations may be used to sample the lighting at characteristic points associated with a graphical object.

In our implementation of color warping, the pre-processor computes the lighting equation and determines how the resulting lighting value I (possibly for each RGB component) changes in magnitude from frame to frame. To evaluate the change in lighting from frame to frame, the pre-processor computes the lighting equation for characteristic points at a first and a subsequent frame using the surface normal at the characteristic point, the direction of the light source for each frame, and possibly other data associated with the particular lighting equation.

The system can sample lighting change at characteristic points on an object represented by the sprite or at characteristic points on a bounding volume of the object. For instance, the system can sample lighting changes at normals on the surface of a bounding sphere or set of bounding spheres of the object or parts of the object. The object's surface (or characteristic points on that surface) can be replaced with a series of geometrically simple objects like spheres which together bound the surface and its normal distributions and for which changes in photometry over time can be conservatively bounded with a simple computation.

Based on the lighting changes, the system can determine how to modify the sprite color values to approximate these lighting changes. Similar to the geometric transform performed on a sprite, the system computes how to warp the color values of the sprite to approximate the lighting change. One way to compute the color warp is to use a least squares fit approach. The preprocessor can compute the color multiplier to approximate the change in photometry using a least squares technique that best matches the original color values of the characteristic points to the new color values in a subsequent frame. The result of this step is a constant, linear or higher order warp used to modify (e.g. multiply by a scaling factor and/or add an offset) the color values at pixel locations across the sprite.

The color warp includes a multiplier or an array of multipliers applied across the sprite. In the simplest case, the color warp can simply be a constant scale factor applied to all pixels in the sprite (e.g., a per-sprite color multiplier that scales each sprite sample in the same way). A more accurate approach is to use a linear or higher order warp to approximate the lighting changes. Preferably, the multiplier is vector-valued so that the color components can be scaled independently. To accurately model changes from colored light sources, each color component should be scaled independently.

In addition to the multiplier, an offset value, added to a color value in the sprite, can also be computed based on the lighting changes at the characteristic points.

The multiplier and offset values can be computed by solving for a multiplier and offset that represent the change in the lighting equation at each characteristic point, whether the characteristic points are located at the surface of the object, at the surface of a bounding volume, or both. The pre-processor can compute a multiplier, an offset, or both by selecting a multiplier or offset, or a combination of a multiplier and offset that causes the same or substantially the same change of the lighting equation at each characteristic point as observed during the sampling stage. A least-squares fit can be used to compute the multiplier and offset that best match the color values of characteristic points in the initial rendering with the color values sampled at the characteristic points of an object in a later frame.

Once these multipliers and/or offsets are computed, there are a number of ways to compute the multiplier and offsets applied to color values in the sprite. The multiplier/offset computed for the characteristic points can be used to derive a 1) global sprite multiplier/offset, or 2) a spatially-varying multiplier/offset. One way to compute the global sprite multiplier and offset is to average the multipliers and offsets at the characteristic points to compute a single scale factor and offset for the sprite. The spatially varying multiplier/offset can be computed by performing a least squares fit on the multiplier and offsets simultaneously to derive expressions that represent how the multipliers and offsets change with location of the object. This expression can be evaluated in hardware logic using interpolators to compute independent multipliers and/or offsets for pixel locations in the sprite. For example, the sprite engine (described below and illustrated in FIG. 19) can be implemented with a rasterizer having conventional interpolators to interpolate multipliers and/or offsets for each pixel location before multiplying a color value by the multiplier or adding an offset to a color value or a scaled color value (i.e. scaled by the corresponding multiplier computed for the pixel location).

Just as the system evaluates the accuracy of the geometric warp, the system can also evaluate the accuracy of the color warp by comparing color values computed by color warping with corresponding color values computed for the current frame using the normal rendering process. If the color values differ by more than a predefined tolerance, then the sprite should be re-rendered. In this case, the photometric fiducial indicates how accurate the color warp models the change in lighting at selected points. An another alternative is to measure the photometric error without the color warp of a sprite and use the color warp if the photometric error is below a threshold. This approach does not directly measure the error of the color warp, but instead, just assumes that the color warp can reduce the photometric error of the sprite without the color warp.

Like a geometric warp, the color warp provides a significant advantage in a layered graphics rendering pipeline because it reduces rendering overhead. Since lighting changes can be approximated with a color warp, the rendering system does not have to update a sprite as frequently, but instead, can re-use it for additional frames of animation.

Compositing

A layered graphics rendering pipeline generates an output image by compositing image layers to produce output pixels. If the image layers are not in a common coordinate system, the graphics pipeline has to transform the samples in the image layers to a common coordinate system before compositing them. The compositor can then combine samples from different layers using image operators..

The compositor can be designed to combine pre-transformed or post-transformed image layers. In this context, the term "transformed" means that a sprite display processor has applied the sprite's 2D transform to the sprite to transform the sprite to output device coordinates (screen coordinates). Performing compositing operations on pre-transformed sprites can save the extra overhead associated with transforming the sprites in cases where the combined pixels are not going to be displayed immediately. In these cases, the compositor can combine pre-transformed layers, and then write the results back to sprite memory. Later, to display the combined layers, the sprite display processor can retrieve the combined layers from sprite memory and instruct the compositor to combine them with any other layers to construct final output pixels for display.

An additional advantage to compositing pre-transformed sprites is that it enables the sprite display processor to transform the composited sprite samples that result from intermediate composite operations. It is important to keep in mind, however, that pre-transformed sprites should be in a common coordinate system, namely, have the same spatial resolution and orientation. An alternative way to support transforms on composited sprites is to implement a path from memory buffers or registers in the compositor back to the sprite display processor. This is similar to transferring the intermediate results of a compositing operation to sprite memory, except that the intermediate results are transferred directly to the sprite display processor rather than being temporarily stored back in sprite memory.

Sprite memory is a memory device for storing rendered image layers (sprites). For example, in the implementation described further below and in U.S. Pat. No. 5,867,166, the sprite memory is a shared RAM memory and the sprite display processor is implemented as a special purpose hardware device called the gsprite engine. These implementation details are described in more detail below. The sprite display processor is a device (either special hardware or programmed computer) that fetches sprites from sprite memory, transforms sprites from sprite space to output device coordinates, and controls the compositing of pre- or post-transformed sprites in the compositor.

The step of transforming sprite samples to screen coordinates can be implemented using any of a variety of conventional image mapping techniques. One approach is to perform a backward mapping of screen pixels to sprite space and filter neighboring sprite samples around this point in sprite space.

Once transformed to the screen the compositor can combine the resulting pixel values using image operators. To perform a wider range of shading operations on factored image layers, the compositor should support image operators in addition to the Over operator.

Generalized Compositor

A wider variety of shading operations can be performed in the compositor if it supports a number of image operators and has buffers for accumulating intermediate and final pixel values.

Figure 17:
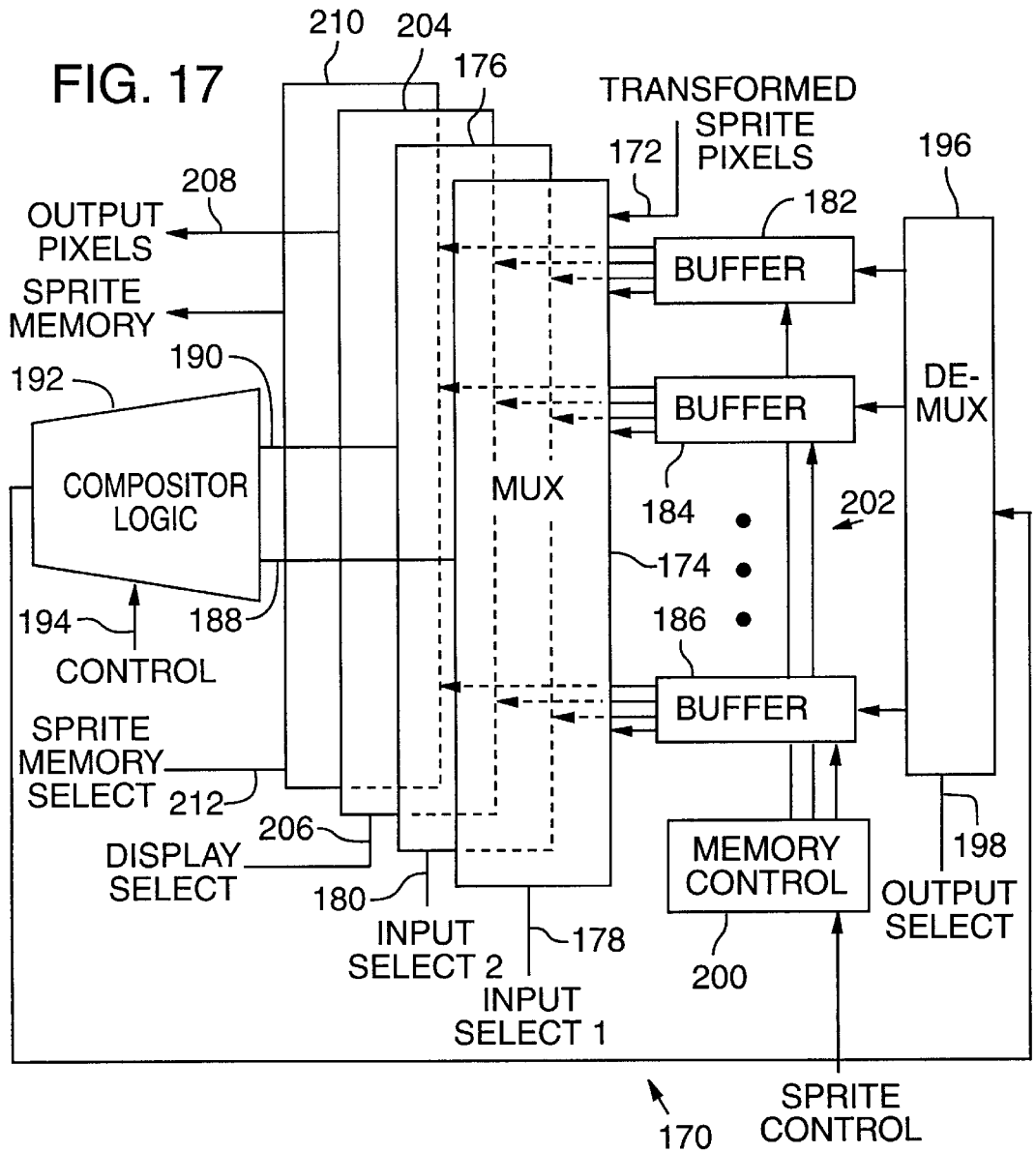
FIG. 17 is a block diagram of a compositor used to combine image layers into an output image.

FIG. 17 is a block diagram illustrating a generalized compositor 170. The compositor receives transformed sprite samples, combines them with intermediate pixel values at corresponding pixel locations from one of its buffers, and then stores the new intermediate or final pixel values in another one of its buffers. Intermediate pixel values refer to results of a compositing operation that will be combined with other pixels to compute final pixels of an output image. Final pixel values refer to pixels that are ready to be scanned out to a display device. As the compositor combines intermediate pixels in one buffer, it transfers final pixel values for display from another buffer.

The input sprite samples 172 enter the compositor 170 at one of two input multiplexers 174, 176. In response to input select signals 178, 180, the input multiplexers 174, 176 select input from a set of buffers 182–186 and the input sprite samples. The multiplexers transfer the selected outputs 188, 190 to the compositing logic 192.

The compositing logic 192 includes a set of image operators that combine pixel values at corresponding pixel locations from two image layers. The control signal 194 of the compositing logic selects the type of image operator. The compositor 170 should preferably support the Over, ADD, and multiplier operators.

Other image operators can also be implemented in the compositor. The following table is a list of image operators from Porter and Duff.

| operation | $F_A$ | $F_B$ |
| --- | --- | --- |
| clear | 0 | 0 |
| A | 1 | 0 |
| B | 0 | 1 |
| A over B | 1 | $1 - \alpha_A$ |
| B over A | $1 - \alpha_A$ | 1 |
| A in B | $\alpha_B$ | 0 |
| B in A | 0 | $\alpha_A$ |
| A out B | $1 - \alpha_A$ | 0 |
| B out A | 0 | $1 - \alpha_A$ |
| A atop B | $\alpha_B$ | $1 - \alpha_A$ |
| B atop A | $1 - \alpha_B$ | $\alpha_A$ |
| A xor B | $1 - \alpha_B$ | $1 - \alpha_A$ |
| A plus B | 1 | 1 |

$F_A$ and $F_B$ represent the fractions of the respective input images that are present in the final, composite image. As Porter and Duff describe, the color component of pixels in the composite image, $c_o$, can be expressed as: $c_A F_A + c_B F_B$, where $c_A$ and $c_B$ are the color components of image A and image B premultiplied by alpha of the pixel, $c_A =_A C_A$; $c_B =_B C_B$.

$C_A$ and $C_B$ are the true color components before pre-multiplication by alpha.

The Porter and Duff operators also include "unary" operators performed on a single image:

darken $(A, \phi) = (\phi r_A, \phi g_A, \phi b_A, \alpha_A)$ dissolve $(A, b) = (\delta r_A, \delta g_A, \delta b_A, \delta_A)$;

where normally, $0 \leq \phi$, $\delta \leq 1$. These image operators and those described previously are a representative, but not an exclusive listing of the types of image operators that can be implemented in the compositing logic.

The compositing logic 192 sends its output to a demultiplexer 196. The demultiplexer selects one of the buffers 182–186 that will receive the pixel values produced by the compositing logic. In response to an output select signal 198, the demultiplexer 196 selects one of the buffers and transfers the pixel values from the compositing logic 192 to the selected buffer.

The number of buffers used to implement the generalized compositor can vary. The compositor should include at least one buffer for holding final pixels in the output image, and two additional buffers for combining intermediate results. It is also possible to use separate buffers for alpha and color values. The buffers do not need to be large enough to store an entire output image. For example, they could be designed to hold a scanline or a scanline band.

The compositor has memory control logic 200 to control the transfer of pixels into and from the buffers. By sending control signals 202 to the buffers, the memory control logic controls the rate at which pixel values are scanned from the buffers and ensures that the inputs to the compositing operation are synchronized.

To send output pixels to the display, the compositor has an output multiplexer 204 that selects one of the buffers in response to an output select signal 206. The memory control 200 controls the transfer of pixels 208 from the selected buffer to the output multiplexer 204.

To send output pixels back to sprite memory, the compositor has a sprite memory mulitplexer 210 that selects one of the buffers in response to sprite memory select signal 212. This path back to sprite memory allows the compositor to combine pre-transformed image layers. Note that the sprite memory multiplexer 210 does not need to be implemented using a separate multiplexer. For example, it can be implemented as part of the output multiplexer, or one or more of the buffers can be interfaced with sprite memory to allow the results of compositing operations to be written directly from a buffer to sprite memory.

The generalized compositor operates under the control of a sprite display processor. One example of the sprite display processor, called the gsprite engine, is described further below and in co-pending application Ser. No. 08/671,412. The sprite display processor sends the input select signals, the output select signal, the display select signal and the memory control signals to the compositor 170. The sprite display processor also selects the image operator by sending the control signal to the compositing logic.

Regulation

An important advantage of the layered pipeline is that it can allocate rendering resources to separate image layers. In addition to the traditional quality parameters such as geometric level-of-detail or the quality of the shading model (e.g., flat, Gouraud, or Phong-shaded), the quality parameters in the layered pipeline include the temporal and spatial resolution of separate image layers. To achieve optimal quality with fixed rendering resources, the layered pipeline uses a regulator to adjust the quality parameters. The regulator is the part of the graphics preprocessor that dynamically measures the costs and benefits of changing the quality parameters and allocates rendering resources accordingly.

In this context, the costs refer to the change in render resources consumed as a result of a change in the quality parameter. For example, if the regulator increases the update rate, the cost increases because the renderer will need to scan convert more geometric primitives (e.g., polygons) per frame on average. If the regulator increases the resolution of an image layer, the cost increases because the renderer will need to rasterize more pixels per polygon.

The benefits refer to the change in perceptual fidelity reflected in the fiducials. For example, if a warped layer's fiducials turn out to fall within threshold values on the fiducials, the warped layer is a good approximation of a re-rendered layer. As an alternative, the regulator can be programmed to assign a rendering priority to warped layers based on the extent of their distortion, measured by the amount that the fiducials surpass corresponding thresholds.

Figure 18:
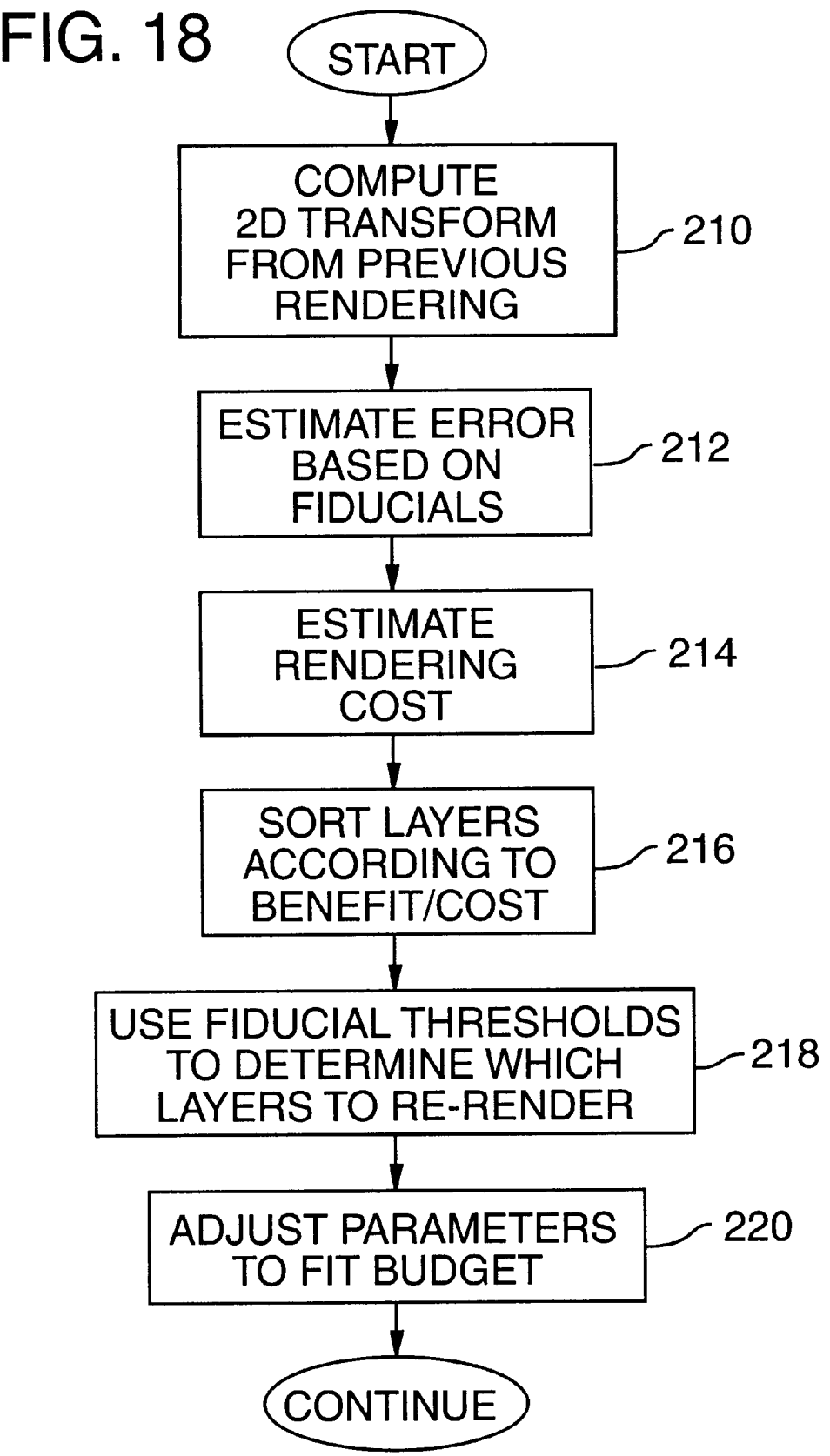
FIG. 18 is a flow diagram illustrating a method for regulating update rate and spatial resolution of image layers in a layered graphics rendering pipeline.

Our implementation of the regulator uses a simple cost-benefit scheduler and fiducial thresholds. The fiducial threshold provides a cutoff below which no attempt to re-render the layer is made (i.e., the image warp approximation is used). FIG. 18 is a flow diagram illustrating how this implementation of the regulator allocates rendering resources for each frame. The regulator is implemented in the preprocessor of a layered graphics rendering pipeline.

The first step 210 is to compute the sprite transforms for each of the independent scene elements in the layered pipeline. For scene elements rendered in a previous frame, the preprocessor computes a warp based on the previous rendering using the characteristic points of the previous and current frame.

In the next step 212, the preprocessor computes fiducials to estimate the distortion of the warped sprite. In this step, the preprocessor can use any combination of the four fiducial types described above.

Next, the preprocessor estimates the rendering cost of each layer as shown in step 214. Our implementation of the regulator bases this cost estimate on a polygon budget, and measures the fraction of this budget consumed by the number of polygons in the object geometry of each layer.

In step 216, the preprocessor sorts layers according to the benefit and cost. Next, it uses the fiducial thresholds to determine which layers to re-render as shown in step 218. The preprocessor selects the layers that do not satisfy thresholds on the fiducials. It then adjusts the quality parameters of the selected layers to fit within a budget as depicted in step 220. Specifically, the regulator adjusts the sprite's spatial resolution to fit within a budgeted total sprite size. This accounts for the rate at which the renderer can rasterize pixels. Our implementation uses a global average depth-complexity estimate to reduce the budget to account for rasterization of hidden geometry. The depth complexity of factored geometry is much less than a frame buffer rendering of the entire scene. Sprites that have been selected for re-rendering in step 218 are allocated part of this total budget in proportion to their desired area divided by the total desired area of the selected set. To dampen fluctuations in the regulation parameters which are perceptible when large, parameter changes are clamped to be no more than ±10% of their previous value at the time of last re-rendering.

At this point, the renderer renders the selected layers in order, stopping when all resources are used. Our regulator can be used as a "budget-filling" regulator or a "threshold" regulator. For a budget-filling regulator, the fiducial threshold is set to be small, on the order of a 1/1000 of the typical maximum error. All of the rendering resources are used in the attempt to make the scene as good as possible. For a threshold regulator, the threshold is raised to the maximum error that the user is willing to tolerate. This allows rendering resources to be used for other tasks.

Layered Pipeline Implementation

One implementation of a layered graphics rendering pipeline is described in U.S. Pat. No. 5,867,166. For convenience, we describe the details of the architecture here.

Figure 19:
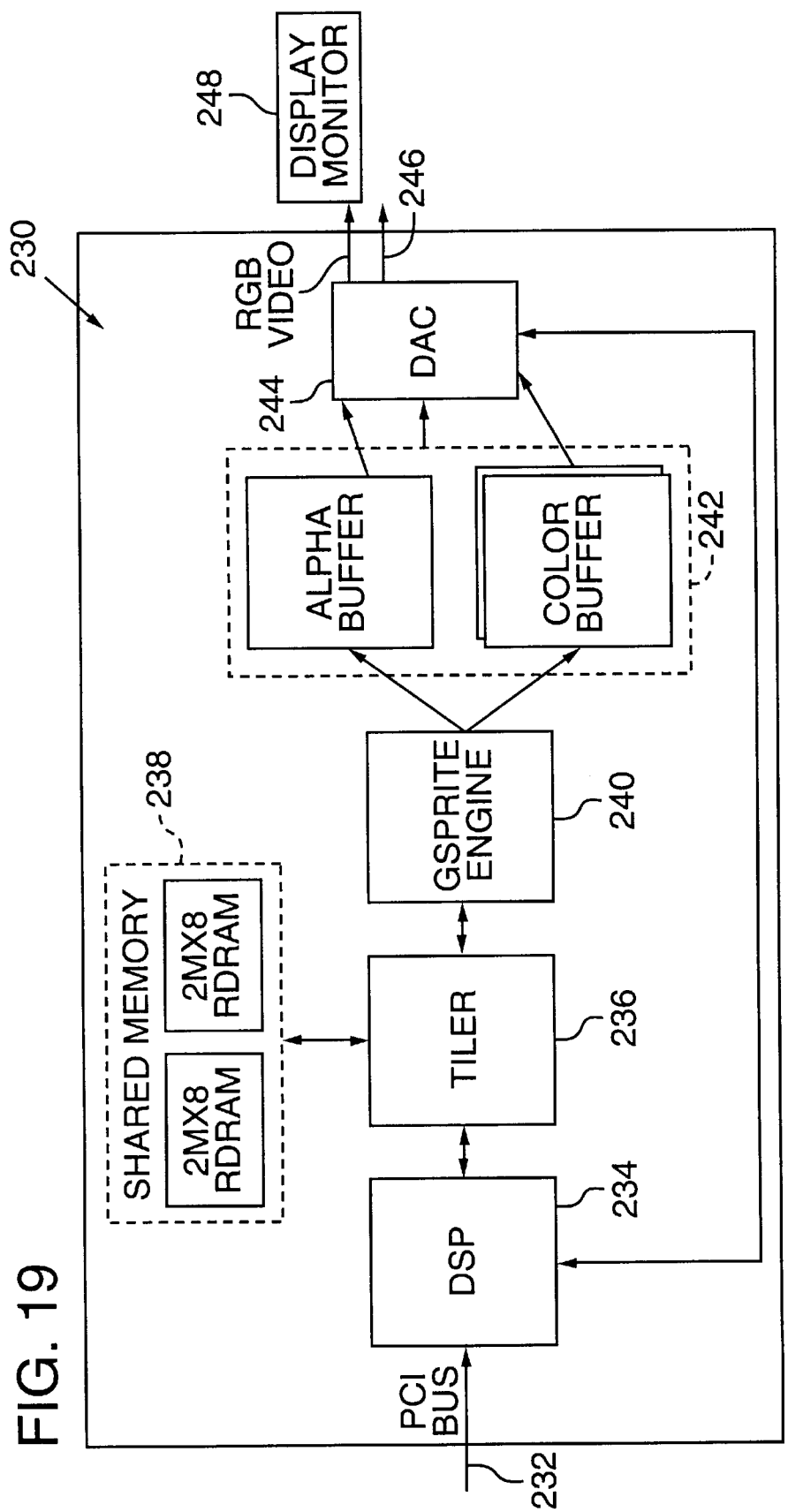
FIG. 19 is a block diagram of a rendering system that supports a layered graphics rendering pipeline.

FIG. 19 is a block diagram illustrating an implementation of a layered graphics rendering system 230. This implementation is designed to communicate with a host computer (a PC) through a bus 232. The tasks of the preprocessor described above are shared between a microprocessor on the host PC and a DSP 234. It is also possible to implement the functions of the preprocessor entirely in a single processor, such as the microprocessor of a host PC.

The rendering system includes the DSP 234, tiler 236, shared memory 238, the gsprite engine 240, compositing buffer 242, and a digital-to-analog converter (DAC) 244. The bus 232 transfers commands and data between the host and the DSP 234. In response to rendering commands from the host, the rendering system renders independent scene elements to sprites, combines the sprites into display images, and transfers the display images to a display device through the DAC 244.

The shared memory 238 stores image processing commands and sprites in a specific sprite format called a gsprite (generalized sprite). In this implementation, the shared memory is used to store gsprite and texture data in compressed form, DSP code and data, and various buffers used to transfer data between processing subsystems. The shared memory 216 shown here comprises 4 Mbytes of RAM, and is implemented using two 8-bit Ram bus channels.

The DSP 234 is responsible for performing front end geometry processing, and sprite management. Specifically, the DSP performs front end geometry and lighting calculations used for 3-D graphics. This includes model and viewing transformations, clipping, and lighting. The DSP also performs sprite management including 1) computing sprite transforms, 2) sorting geometry assigned to a sprite among 32×32 sample chunks; 3) tracking sprite motion through their characteristic points; 4) computing warps to approximate changes in position and lighting of previous renderings; 5) computing fiducials; 6) and regulating rendering resources by dynamically adjusting quality parameters of image layers. In sum, the DSP functions as the preprocessor in the layered pipeline. It is important to note that the functions of the preprocessor can also be implemented on the host processor, instead of using both the host processor and DSP.

The architecture of the rendering system shown in FIG. 19 is relatively independent of the specific DSP. However, the DSP should preferably have significant floating point performance. Suitable DSPs include the MSP-1 from Samsung Semiconductor and TriMedia from Phillips Semiconductor. These specific DSPs are two examples of DSPs that provide sufficient floating point performance. The host processor can used in place of the DSP and interface directly with the tiler 236 through the bus 232.

The rendering system 230 shown in FIG. 19 manages image data in three different units: gsprites, chunks, and blocks. The system serially renders image layers in 32×32 sample chunks. To prepare an object for rendering to a sprite, the DSP divides a sprite into chunks and sorts geometry assigned to the sprite among the chunks. The DSP also computes a gsprite display list that lists the gsprites for an output image. This display list includes pointers to gsprites, and more specifically, to gsprite data structures called header blocks. The gsprite header block stores a number of attributes of a gsprite including gsprite width, height, and an affine transform defined in terms of a screen space parallelogram (it may be preferable to use a rectangle to reduce anisotropy of sprite samples). The gsprite header block also includes a list of its member chunks. This list is in the form of pointers to chunk control blocks.

The DSP 234 sets up the gsprite header blocks and stores them in shared memory 238. The gsprite header block includes a header for storing various attributes of the gsprite and for keeping track of where related image data is stored in the shared memory. The data structure includes fields to store the size of the gsprite, to represent the edge equations for the screen edges of the gsprite, to maintain 2-D transform data, and other image attributes.

Chunk control blocks include per chunk and per block parameters. The per chunk parameters include compression parameters, pixel format, and whether the pixel data resides in memory managed in Memory Allocation Units (MAU) in linear memory. An MAU is a piece of shared memory used to allocate chunk memory. MAU managed memory includes a list of MAUs (124 bytes for example), each MAU having a pointer to the next MAU. In one specific implementation for example, the chunk control blocks are stored in sequential MAUs for each gsprite.

The per block parameters include compression type, number of MAUs the block spans, and a block pointer pointing to the first byte of pixel data for the block. The specific block format is an 8×8×4 array of pixels that encode 32 bit pixels (8-bits for RGB and Alpha).

The tiler 236 performs scan-conversion, shading, texturing, hidden-surface removal, anti-aliasing, translucency, shadowing, and blending for multi-pass rendering. Preferably the tiler is implemented as a VLSI chip along with the gsprite engine 240. The tiler rasterizes polygons one chunk at a time in a serial fashion. It has double buffered rasterization buffer so that it can compute sprite samples in one buffer, while resolving fragments for samples in the second buffer. The tiler compresses and stores the resulting rendered gsprite chunks in the shared memory.

The gsprite engine 240 operates at video rates to address and decompress the gsprite chunk data and perform the necessary image processing for general affine transformations (which include scaling, translation with subpixel accuracy, rotation, reflection and shearing). The gsprite engine can be implemented on the same or a different chip from the tiler 236. If on a separate chip, it interfaces with a memory interface unit in the tiler to access the gsprite data structures in shared memory.

The gsprite engine 240 includes a video timing generator which controls video display refresh, and generates the timing signals necessary to control gsprite accesses. To display each frame, the gsprite engine 240 traverses the gsprite display data structures to determine which gsprites need to be read for any given 32-scanline band. For each gsprite in a band, the gsprite engine reads the header block, clips the gsprite to the current display band, and places the gsprite in the gsprite queue for rasterization. The gsprite engine scans each gsprite based on the specified affine transform in the gsprite header and generates read requests. To hide the latency of gsprite accesses, the gsprite engine utilizes a caching scheme that pre-fetches and caches gsprite blocks in a cache memory before a rasterizer computes transformed sprite samples using the cached data.

A simple rasterizer in the gsprite engine scans each gsprite based on the specified affine transform in the gsprite header and calculates the filter parameters for each pixel. The gsprite engine uses a filter to map color and alpha data at sample locations in gsprite space to screen space. Specifically, it applies either a 2×2 or 4×4 filter kernel to compute pixel values (color or both color and alpha) at pixel locations in screen space.

The gsprite engine has a compositing buffer control for controlling the operation of a compositing buffer. The compositing buffer control passes transformed sprite samples and instructions on how to combine samples from different layers. The compositing buffer control monitors a ready line from the compositing buffer 242 to ensure that the gsprite engine 240 does not overrun the compositing buffer 242.

Gsprite chunk data is processed a number of scan lines at a time for display. In one implementation, chunk data is processed 32 scan lines at a time. This implementation of the compositing buffer (242) includes two 32 scan line color buffers which are toggled between display and compositing activities. The compositing buffer also includes a 32 scan line alpha buffer which is used to accumulate alpha for each pixel. This particular compositing buffer has compositing logic that implements the standard Over image operator. The compositing logic receives transformed sprite samples, and combines them with the accumulated color values using the alpha values from the alpha buffers. As an alternative, the compositing buffer can be implemented as shown in FIG. 18 and described above.

The DAC 244 includes a RGB video DAC and corresponding video port 246, to video editing devices. Individual components can be used to implement the functionality of the DAC. The DAC 244 implements the basic functions that are common to most RAMDACs on the market today. The DAC includes logic for reading and writing internal control registers, and for pipelining the video control signals. The DAC includes pixel data routing logic that controls the routing of pixel data from the compositing buffers to the display monitor 248. In the normal operating mode, this data is passed at pixel rates to Color LUTs for each of the three channels. The DAC also has a clock generator that generates the video clock. These clocks are generated by two phase locked clock generators to eliminate synchronization drift.

Though we described a specific implementation of the layered pipeline, it is important to emphasize that our method for rendering factored terms of a shading model can apply to other architectures as well. As noted above, the functions of the layered pipeline can be emulated in software instructions. These software instructions can be stored on any of a variety of conventional computer readable media and executed on commercially available processors including the microprocessor of a PC or workstation, or on a DSP such as shown in FIG. 19.

Portions of the layered rendering pipeline can be implemented in either software or hardware. In the description above, the functions of the preprocessor are designed to be implemented in a processor such as the DSP or the microprocessor of computer system. The tiler represents a specific example of a renderer in a layered pipeline, but other more conventional hardware or software renderers can be used instead to render object geometry to image layers. The gsprite engine and compositing buffer form one implementation of a compositor in a layered pipeline, and other implementations are possible as well. For example, the compositor can be emulated in software, or can be emulated in other graphics rendering systems that support texture mapping.

While the description of fiducials above pertains primarily to fiducials used to measure the distortion of warped image approximations, the fiducials can be used in other applications as well. For example, the fiducials can be used to measure the distortion of a scene element when it is rendered to an image and then re-used for more than one frame. The method for measuring fidelity is not limited to frames of animation, but instead, applies more generally to instances of a scene element from one instant in time to another. These instants in time can be frames of animation or other measures of time that represent an instant in an animation sequence.

In view of the many possible embodiments to which the principles of our invention may be applied, it should be recognized that the implementations described above are only examples of the invention and should not be taken as a limitation on the scope of the invention. Rather, the scope of the invention is defined by the following claims. We therefore claim as our invention all that comes within the scope and spirit of these claims.

We claim:

1. In a real time graphics rendering pipeline, a method for measuring fidelity of a transformed image layer that approximates motion of 3D object geometry, comprising:

factoring a scene into scene elements, where the scene elements include a 3D object or set of 3D objects in the scene;

independently rendering the scene elements to separate image layers;

computing a 2D transform that approximates motion of a scene element from an initial frame to a current frame in an animation sequence;

computing sampling distortion of the 2D transform;

using the sampling distortion to determine whether to re-render the scene element for the current frame;

approximating motion of the scene element by using the sprite transform to transform an initial rendering of the scene element at the initial frame to a new position in the current frame;

compositing the image layers, including at least one transformed layer, into an output image in output device coordinates to construct each frame in the animation sequence.

2. The method of claim 1 wherein the scene elements are rendered to separate image layers, each in a corresponding sprite coordinate space, and each at a non-fixed location in output device coordinates.

3. The method of claim 2 wherein at least one corresponding sprite space has a different spatial resolution from the output device coordinates.

4. The method of claim 2 wherein at least one corresponding sprite space has a different orientation from the output device coordinates.

5. The method of claim 1 wherein the step of computing the sampling distortion includes computing singular values for the 2D transform.

6. The method of claim 1 wherein the 2D transform is an affine transform that is capable of computing translation, rotation, scaling and shear of an image layer to approximate motion of object geometry depicted in the image layer.

7. The method of claim 6 including:

computing sampling distortion for image samples in a variety of locations across the initial rendering of the first scene element;

using the sampling distortion for the image samples across the initial rendering to determine whether to re-render the first scene element.

8. A computer readable medium including computer-executable instructions for performing the steps of claim 1.

9. In a real time graphics rendering pipeline, a method for measuring fidelity of a transformed image layer comprising:

factoring a scene into scene elements, where the scene elements include a 3D object or set of 3D objects in the scene;

independently rendering the scene elements to separate image layers;

computing a 2D transform that approximates motion of a scene element from an initial frame to a current frame in an animation sequence;

computing visibility distortion caused by approximating motion of the scene element with the 2D transform by determining transitions between back-facing to front-facing surfaces of characteristic geometry of the scene element from the initial frame to the current frame;

using the visibility distortion to determine whether to re-render the scene element for the current frame;

approximating motion of the scene element by using the 2D transform to transform an initial rendering of the scene element at the initial frame to a new position in the current frame;

compositing the image layers, including one or more transformed layers, into an output image in output device coordinates to construct each frame in the animation sequence.

10. The method of claim 9 wherein the image layers correspond to non-fixed portions of the output image.

11. The method of claim 9 including:

computing 2D transforms for each of the scene elements to approximate the motion of the scene elements from a previous frame to the current frame;

computing visibility distortion for each of the scene elements;

determining whether to re-render the scene elements based on the visibility distortion of each of the scene elements.

12. The method of claim 9 further including:

clipping characteristic geometry of the scene elements to an expanded viewing frustum that extends beyond screen boundaries of the output image;

tracking position of clipped points of the characteristic geometry to determine whether the clipped points, when projected to the viewing frustum, are located within the screen boundaries;

determining whether to re-render the image layers when the clipped points corresponding to the image layers are within the screen boundaries.

13. A computer readable medium having computer-executable instructions for performing the steps recited in claim 9.

14. In a real time graphics rendering pipeline, a method for measuring fidelity of a transformed image layer comprising:

factoring a scene into scene elements, where the scene elements include a 3D object or set of 3D objects in the scene;

independently rendering the scene elements to separate image layers;

computing a 2D transform that approximates motion of a scene element from an initial frame to a current frame in an animation sequence by transforming an image layer representing an initial rendering of the scene element;

measuring change in lighting of the scene element to compute photometric distortion of the 2D transform;

using the photometric distortion to determine whether to re-render the first scene element;

approximating motion of the scene element by using the 2D transform to transform an initial rendering of the scene element at the initial frame to a new position in the current frame;

to construct frames in the animation sequence, compositing the image layers, including at least one transformed layer, into an output image in output device coordinates.

15. The method of claim 14 wherein the step of computing the photometric distortion includes sampling lighting at characteristic points of the scene element at the initial frame and the current frame, and determining the change in color values at the characteristic points.

16. The method of claim 14 wherein the step of computing the photometric distortion includes determining change in position of a light source relative to the scene element from the initial frame to the current frame.

17. The method of claim 16 wherein the step of computing the photometric distortion includes determining angular change in position of a light source relative to the scene element from the initial frame to the current frame.

18. The method of claim 16 wherein the step of computing the photometric distortion includes determining change in distance of a light source relative to the scene element from the initial frame to the current frame.

19. The method of claim 16 wherein the step of computing the photometric distortion includes determining change in position of a viewpoint of the scene relative to the scene element from the initial frame to the current frame.

20. The method of claim 14 further including performing a color warp to approximate lighting change from the initial rendering to the current frame.

21. A computer-readable medium having computer executable instructions for performing the steps recited in claim 14.

22. In a real time graphics rendering pipeline, a method for measuring fidelity of a transformed image layer comprising:

factoring a scene into scene elements, where each scene element includes a 3D object or set of 3D objects in the scene;

independently rendering the scene elements to separate image layers;

computing a color warp that approximates change in lighting of a scene element from an initial frame to a current frame in an animation sequence by modifying color values in an image layer representing an initial rendering of the scene element;

measuring a difference between warped color values computed by performing the color warp on the initial rendering and color values of the scene element for the current frame to compute photometric distortion;

using the photometric distortion to determine whether to re-render the scene element;

approximating the change in lighting of the scene element by using the color warp to modify the color values in the initial rendering of the scene element at the initial frame to new color values for the current frame;

compositing the image layers, including at least one layer modified using a color warp, into an output image in output device coordinates to construct each frame in the animation sequence.

23. The method of claim 22 wherein the step of computing the photometric distortion includes sampling lighting at characteristic points of the scene element and determining how the sampled lighting differs from lighting at warped samples corresponding to the characteristic points.

24. The method of claim 22 wherein the step of computing the photometric distortion includes determining the change in position of a light source relative to the first scene element from the initial frame to the current frame.

25. The method of claim 22 wherein the color warp comprises a single color multiplier applied to samples in the initial rendering.

26. The method of claim 23 wherein the color warp comprises an array of multipliers applied to samples in the initial rendering, where the values of the multipliers in the array vary with location and are based on lighting sampled at the characteristic points of the scene element.

27. The method of claim 23 wherein the color warp comprises at least one multiplier and at least one offset applied to samples of the initial rendering to approximate lighting changes.

28. A computer-readable medium having computer executable instructions for performing the steps recited in claim 22.

29. In a real time graphics rendering pipeline, a method for measuring fidelity of a transformed image layer in an output image comprising:

factoring a scene into scene elements, where the scene elements include a 3D object or set of 3D objects in the scene;

independently rendering the scene elements to separate image layers, including rendering a scene element to a 2D sprite space at a different resolution than a resolution of the output image;

computing a 2D transform that transforms the scene element from the 2D sprite space to the screen space of a display device;

computing sampling distortion of the 2D transform;

using the sampling distortion to determine whether to render the scene element at a different spatial resolution;

using the 2D transform to transform a rendering of the scene element from the 2D sprite space to the screen space;

compositing the image layers, including at least one transformed layer, into an output image in screen space to construct each frame in the animation sequence.

30. In a real time graphics rendering pipeline, a method for measuring fidelity of a transformed image layer comprising:

factoring a scene into scene elements;

independently rendering the scene elements to separate image layers;

computing a 2D transform that approximates motion of a scene element from an initial frame to a current frame in an animation sequence;

computing sampling distortion, photometric distortion, geometric distortion and visibility distortion of a transformed image layer representing the scene element;

using the sampling distortion, photometric distortion, geometric distortion and visibility distortion to determine whether to re-render the scene element;

approximating motion of the scene element by transforming an initial rendering of the scene element at the initial frame to a new position in the current frame;

compositing the image layers into a output image in output device coordinates to construct frames in the animation sequence.

31. A method for measuring fidelity of a transformed image layer, comprising:

computing a 2D transform that approximates motion of a scene element from an initial frame to a current frame in an animation sequence;

computing a sampling distortion measure of the 2D transform; and using the sampling distortion measure to determine accuracy of approximating motion of the scene element with the 2D transform.

32. The method of claim 31 further including:

approximating motion of the scene element by using the 2D transform to transform the initial rendering of the scene element at the initial frame to a new position in the current frame; and compositing image layers, including at least one transformed layer, into an output image in output device coordinates to construct each frame in the animation sequence.

33. The method of claim 31 wherein the step of computing the sampling distortion measure includes computing singular values for the 2D transform.

34. The method of claim 31 wherein the 2D transform is an affine transform that is capable of computing translation, rotation, scaling and shear of an image layer to approximate motion of object geometry depicted in the image layer.

35. The method of claim 31 including:

computing sampling distortion for image samples in a variety of locations across the initial rendering of the first scene element.

36. A computer readable medium including computer-executable instructions for performing the steps of claim 31.

37. A method for measuring fidelity between instances of a scene element comprising:

computing a visibility distortion measure of the scene element; and using the visibility distortion measure to determine distortion of an approximation of the scene element.

38. The method of claim 37 wherein the step of computing the visibility distortion measure includes:

determining transitions between back-facing to front-facing surfaces or between front-facing to back-facing surfaces of characteristic geometry of the instances of the scene element.

39. The method of claim 37 wherein the step of computing the visibility distortion measure includes:

determining whether a clipped point of the scene element intersects with screen boundaries of a display device on which a rendering of the scene element is displayed.

40. The method of claim 37 wherein the step of computing the visibility distortion measure includes:

determining transitions between front-facing to back-facing surfaces or between back-facing to front-facing surfaces of characteristic polygons of the instances of the scene element and weighting the transitions by screen area occupied by the characteristic polygons.

41. The method of claim 37 further including:

approximating motion of the scene element by using a 2D transform to transform an initial rendering of a first instance of the scene element to a new position.

42. The method of claim 37 further including:

clipping characteristic geometry of the scene element to an expanded viewing frustum that extends beyond screen boundaries of an output image;

tracking position of a clipped point of the characteristic geometry to determine whether the clipped point, when projected to the viewing frustum, is located within the screen boundaries;

determining whether to re-render the scene element when the clipped point corresponding to the scene element is within the screen boundaries.

43. A computer readable medium having computer-executable instructions for performing the steps recited in claim 37.

44. A method for measuring fidelity between instances of a scene element comprising:

computing a photometric distortion measure of the scene element; and using the photometric distortion measure to determine distortion of an approximation of the scene element.

45. The method of claim 44 further including:

using the photometric distortion measure to determine whether to re-render the first scene element.

46. The method of claim 44 further including:

to construct frames in the animation sequence, compositing image layers, including at least one transformed layer, into an output image in output device coordinates.

47. The method of claim 44 wherein the step of computing the photometric distortion measure includes sampling lighting at characteristic points of a first and second instance of the scene element, and determining the change in color values at the characteristic points between the first and second instances.

48. The method of claim 44 wherein the step of computing the photometric distortion measure includes determining change in position of a light source relative to the scene element between a first and second instance of the scene element.

49. The method of claim 44 further including:

approximating motion of the scene element by using a 2D transform to transform an initial rendering of the scene element to a new position;

using the photometric distortion measure to determine distortion of approximating motion of the scene element with the 2D transform.

50. The method of claim 44 further including performing a color warp to approximate lighting change between first and second instances of the scene element.

51. The method of claim 44 including:

computing a color warp that approximates change in lighting of the scene element between first and second instances of the scene element by modifying color values in an image layer representing an initial rendering of the scene element;

measuring a difference between warped color values computed by performing the color warp on the initial rendering and color values of the second instance of the scene element to compute the photometric distortion measure; and using the photometric distortion measure to determine whether to re-render the scene element.

52. The method of claim 51 further including:

approximating the change in lighting of the scene element by using the color warp to modify the color values in the initial rendering of the scene element to new color values.

53. A computer-readable medium having computer executable instructions for performing the steps recited in claim 44.

54. A method for measuring fidelity of a transformed image layer comprising:

computing a color warp that approximates change in lighting of a scene element from an initial frame to a current frame in an animation sequence by modifying color values in an image layer representing an initial rendering of the scene element; and measuring a difference between warped color values computed by performing the color warp on the initial rendering and color values of the scene element for the current frame to compute photometric distortion.

55. The method of claim 54 further including:

approximating the change in lighting of the scene element by using the color warp to modify the color values in the initial rendering of the scene element at the initial frame to new color values for the current frame.

56. A graphics rendering system comprising:

a preprocessor for computing a sprite transform used to approximate motion of a scene element and for computing the fidelity of a transformed image layer by measuring sampling, lighting, or visibility distortion of the transformed image layer as a result of the sprite transform being applied to a rendering of the scene element;

a rendering sub-system for rendering a scene element to an image layer, and for transforming the image layer by applying the sprite transform to the image layer to approximate motion of the scene element in frames of animation.

57. The graphics rendering system of claim 56 wherein the rendering system is operable to render more than one scene element to separate image layers and is operable to composite the image layers into a final output image.

58. A method for measuring the fidelity of an image layer that is re-used in an animation sequence comprising:

computing a visibility or photometric distortion measure of a scene element of the image layer; and using the visibility or the photometric distortion measure to determine the accuracy of re-using the image layer rather than re-rendering the scene element for the image layer.

* * * * *

UNITED STATES PATENT AND TRADEMARK OFFICE
CERTIFICATE OF CORRECTION

PATENT NO. : 6,064,393

DATED : May 16, 2000

INVENTOR(S) : Lengyel et al.

It is certified that errors appear in the above-identified patent and that said Letters Patent is hereby corrected as shown below:

Column 2, line 59, "portion's" should read --portions--.
Column 4, line 49, "is diagram" should read --is a diagram--.
Column 7, line 59, "to by" should read --by--.
Column 15, line 9, ".." should read --.--.
Column 16, line 38, "display's" should read --displays--.
The text in column 18, line 63 through Column 19, line 40 is duplicative of the text immediately following.
Column 19, line 46, "154a-c" should read --155a-c--.
Column 21, line 54, "compares normal" should read --compares a normal--.
Column 23, line 26, "the" should read --The--.
Column 25, line 4, "An another" should read --Another--.
Column 25, line 24, "operators.." should read --operators.--
Column 26, line 66, "$c_A={}_A$" should read --$c_A=\alpha_A$--.
Column 26, line 67, "$c_B={}_BC_B$" should read -- $c_B=\alpha_B C_B$--.
Column 27, line 6, "$(\phi r_A, \phi g_A, \phi b_A, A)$" should read --$(\phi r_A, \phi g_A, \phi b_A, \alpha_A)$--.
Column 27, line 7, "$(\delta r_A, \delta g_A, \delta b_A, \delta_A)$" should read --$(\delta r_A, \delta g_A, \delta b_A, \delta\alpha_A)$--.
Column 29, lines 59-60, "can used" should read --can be used--.
Column 36, line 1, "a" should read --an--.

Signed and Sealed this

Twenty-second Day of May, 2001

Attest:

NICHOLAS P. GODICI

*Attesting Officer*    Acting Director of the United States Patent and Trademark Office